United States Patent
Cogan et al.

(10) Patent No.: US 9,753,677 B2
(45) Date of Patent: Sep. 5, 2017

(54) APPARATUS AND METHODS FOR IMAGE PROCESSING OPTIMIZATION FOR VARIABLE DATA PRINTING

(71) Applicant: PTI Marketing Technologies Inc., Solana Beach, CA (US)

(72) Inventors: Douglas Neal Cogan, Brookfield, IL (US); Kevin A. Mitchell, Elmwood Park, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 0 days.

(21) Appl. No.: 14/884,643

(22) Filed: Oct. 15, 2015

(65) Prior Publication Data

US 2016/0103639 A1 Apr. 14, 2016

Related U.S. Application Data

(63) Continuation of application No. 14/105,955, filed on Dec. 13, 2013, now Pat. No. 9,207,898, which is a
(Continued)

(51) Int. Cl.
*G06F 3/12* (2006.01)
*G06K 15/02* (2006.01)

(52) U.S. Cl.
CPC ............ *G06F 3/1211* (2013.01); *G06F 3/125* (2013.01); *G06F 3/1212* (2013.01);
(Continued)

(58) Field of Classification Search
None
See application file for complete search history.

(56) References Cited

U.S. PATENT DOCUMENTS

| 4,850,028 A | 7/1989 | Kawamura et al. |
| 5,960,164 A | 9/1999 | Dorfman et al. |

(Continued)

FOREIGN PATENT DOCUMENTS

| EP | 1026876 | 8/2000 |
| EP | 1031916 | 8/2000 |

(Continued)

OTHER PUBLICATIONS

Office Action for U.S. Appl. No. 11/200,861, mailed Oct. 2, 2009.
(Continued)

*Primary Examiner* — Thomas D Lee
(74) *Attorney, Agent, or Firm* — Cooley LLP

(57) ABSTRACT

Apparatus and methods for providing a pre-rasterized print job for variable data printing are disclosed. In one embodiment, a set of printer characteristics may be determined and then transferred to a typesetting system. The typesetting system may then pre-rasterize objects of the print job based in part on the received printer characteristics. A pre-rasterized print job, including the pre-rasterized objects and print layout instructions may then be generated, such as in the form of a PostScript file, which may then be transferred to a raster image processor (RIP) for generation of printed output. In another embodiment, a printer characterization file may be used for execution on a printing system to determine the set of printer characteristics that may include native resolution, rotation angle, compression data and/or other data or information characterizing the printing system.

16 Claims, 19 Drawing Sheets

Related U.S. Application Data continuation of application No. 12/534,717, filed on Aug. 3, 2009, now Pat. No. 8,670,149.

(52) U.S. Cl.
CPC .......... *G06F 3/1243* (2013.01); *G06F 3/1245* (2013.01); *G06F 3/1285* (2013.01); *G06F 3/1286* (2013.01); *G06F 3/1287* (2013.01); *G06F 3/1296* (2013.01); *G06K 15/02* (2013.01)

(56) References Cited

U.S. PATENT DOCUMENTS

| | | |
|---|---|---|
| 6,034,785 A | 3/2000 | Itoh |
| 6,043,826 A | 3/2000 | Manning |
| 6,055,522 A | 4/2000 | Krishna et al. |
| 6,073,147 A | 6/2000 | Chan et al. |
| 6,205,452 B1 | 3/2001 | Warmus et al. |
| 6,327,599 B1 | 12/2001 | Warmus et al. |
| 6,449,053 B2 | 9/2002 | Bando |
| 6,583,887 B1 | 6/2003 | Clouthier et al. |
| 6,615,188 B1 | 9/2003 | Breen et al. |
| 6,615,234 B1 | 9/2003 | Adamske et al. |
| 6,826,727 B1 | 11/2004 | Mohr et al. |
| 6,832,226 B1 | 12/2004 | Parker |
| 6,844,940 B2 | 1/2005 | Warmus et al. |
| 6,919,967 B1 | 7/2005 | Pentecost et al. |
| 6,952,801 B2 | 10/2005 | Warmus et al. |
| 7,117,504 B2 | 10/2006 | Smith et al. |
| 7,268,912 B2 | 9/2007 | Murata |
| 7,300,044 B2 | 11/2007 | Stemmle |
| 7,375,842 B2 | 5/2008 | Kloosterman et al. |
| 7,672,010 B2 | 3/2010 | Hirtenreiter et al. |
| 8,670,149 B2 | 3/2014 | Cogan et al. |
| 2001/0005831 A1 | 6/2001 | Lewin et al. |
| 2002/0052807 A1 | 5/2002 | Han et al. |
| 2002/0069157 A1 | 6/2002 | Jordan |
| 2002/0087702 A1 | 7/2002 | Mori |
| 2002/0097418 A1 | 7/2002 | Chang et al. |
| 2002/0099738 A1 | 7/2002 | Grant |
| 2002/0103826 A1 | 8/2002 | Kriho et al. |
| 2002/0111963 A1 | 8/2002 | Gebert et al. |
| 2002/0120628 A1 | 8/2002 | Hitchcock et al. |
| 2002/0138591 A1 | 9/2002 | Reynolds et al. |
| 2002/0152234 A1 | 10/2002 | Estrada et al. |
| 2002/0194219 A1 | 12/2002 | Bradley et al. |
| 2003/0189726 A1 | 10/2003 | Kloosterman et al. |
| 2004/0073485 A1 | 4/2004 | Liu et al. |
| 2004/0205609 A1 | 10/2004 | Milton et al. |
| 2004/0207876 A1 | 10/2004 | Aschenbrenner |
| 2005/0048458 A1 | 3/2005 | Collins et al. |
| 2005/0086221 A1 | 4/2005 | Parker |
| 2005/0094205 A1 | 5/2005 | Lo et al. |
| 2005/0240971 A1 | 10/2005 | Koppich et al. |
| 2006/0279769 A1 | 12/2006 | Ludwig et al. |
| 2008/0259392 A1 | 10/2008 | Tokumoto |
| 2009/0051947 A1 | 2/2009 | Kuroshima |
| 2010/0064176 A1 | 3/2010 | Negishi |
| 2010/0257446 A1 | 10/2010 | Woolfe et al. |
| 2011/0026042 A1 | 2/2011 | Cogan et al. |
| 2011/0075196 A1 | 3/2011 | Cogan |
| 2014/0104650 A1 | 4/2014 | Cogan et al. |

FOREIGN PATENT DOCUMENTS

| | | |
|---|---|---|
| EP | 1471460 | 10/2004 |
| JP | 2005-022298 | 1/2005 |
| WO | WO 99/19830 | 4/1999 |
| WO | WO 2011/017361 | 2/2011 |

OTHER PUBLICATIONS

Office Action for U.S. Appl. No. 11/200,861, mailed Jun. 21, 2010.
Office Action for U.S. Appl. No. 11/200,861, mailed Jun. 8, 2011.
Office Action for U.S. Appl. No. 11/200,861, mailed Jan. 19, 2012.
Office Action for U.S. Appl. No. 11/200,861, mailed Aug. 30, 2012.
Office Action for U.S. Appl. No. 12/571,387, mailed Nov. 22, 2011.
Office Action for U.S. Appl. No. 12/571,387, mailed Jul. 24, 2012.
International Search Report and Written Opinion for International Application No. PCT/US2010/050302, mailed Dec. 16, 2010.
Office Action for U.S. Appl. No. 12/534,717, mailed Jan. 30, 2013, 13 pages.
International Search Report and Written Opinion for International Application No. PCT/US2010/044298, mailed Oct. 20, 2010.
Office Action for U.S. Appl. No. 14/105,955, mailed Sep. 18, 2014, 5 pages.
Office Action for U.S. Appl. No. 14/105,955, mailed May 6, 2015, 12 pages.

Typical Printing System Configuration

Typical Printing System Workflow

Typical Composition/Typesetter System
Configuration

Typical Printer Configuration

Determination of Printer Characteristics

Generation of Pre-Rasterized Print Job

Rasterizing (Resampling) Image Object at Native Printer Resolution

Examples of Rotation

Printer Output Rotation and Print Flow

Multiple Object Rotations on Printed Page

Arbitrary Rotation Transparency Sections

Pre-Rasterized Printing Process Worflow

Pre-Rasterization Verification

Compression Optimization

Example Printed Output From Postscript Resolution and Angle Test Code

First Page of VDP Printed Output with Pre-Rasterized Image Object

Second Page of VDP Printed Output with
Pre-Rasterized Image Object

Third Page of VDP Printed Output with
Pre-Rasterized Image Object

1100d

Fourth Page of VDP Printed Output with
Pre-Rasterized Image Object

APPARATUS AND METHODS FOR IMAGE PROCESSING OPTIMIZATION FOR VARIABLE DATA PRINTING

CROSS-REFERENCE TO RELATED APPLICATIONS

This application is a continuation of U.S. patent application Ser. No. 14/105,955, now U.S. Pat. No. 9,207,898, filed Dec. 13, 2013, entitled "Apparatus & Methods for Image Processing Optimization for Variable Data Printing," which is a continuation of U.S. patent application Ser. No. 12/534,717, now U.S. Pat. No. 8,670,149, filed Aug. 3, 2009, entitled "Apparatus & Methods for Image Processing Optimization for Variable Data Printing," the contents of which are hereby incorporated by reference herein in their entirety for all purposes.

This application is related to U.S. patent application Ser. No. 11/200,861, entitled "System & Method for Distributed Design of a Variable Data Publication, now U.S. Pat. No. 9,063,921, filed on Aug. 10, 2005, the contents of which is hereby incorporated by reference herein in its entirety for all purposes.

COMPUTER PROGRAM LISTING

This application includes computer program listings of instructions that when executed by, for example, a processor cause the processor to perform one or more embodiments described in the application. The computer program listings are included in the Computer Program Listing Appendix that is stored on a compact disc as filed in U.S. patent application Ser. No. 12/534,717, filed on Dec. 13, 2013. Two identical copies of the compact disc (labeled "Copy 1" and "Copy 2") with the computer program listings are on file with the Office in U.S. patent application Ser. No. 12/534,717, filed on Dec. 13, 2013. The compact discs (both CD-Rs), which were both created on Dec. 13, 2013, have a volume name "PTI," include 34,816 bytes of information in one (1) file, are compatible with IBM PC, and are compatible with an MS-Windows operating system. The files included on the compact discs are American Standard Code for Information Interchange (ASCII) compatible. The computer program listings included in the Computer Program Listing Appendix in U.S. patent application Ser. No. 12/534,717, filed on Dec. 13, 2013, is incorporated by reference in its entirety.

FIELD OF THE INVENTION

The present invention relates generally to digital printing and digital printing systems and methods. More particularly but not exclusively, the invention relates to systems and methods for pre-processing digital printing jobs to minimize raster image processing and maximize printer throughput.

BACKGROUND

As printing technologies migrate from traditional printing methods such as lithography to digital printing, use of digital printers and associated processing of printed images and page layouts in digital printing systems has dramatically increased. While traditional printing methods may still be more cost effective for large quantities of standardized print, the cost of digital printing systems and associated media has continued to decrease, making digital printing more affordable. In addition, digital printing technology can often facilitate customized printing in a more cost-effective way that traditional high volume printing methods.

For example, one type of customized printing is known as variable-data printing (VDP) (also known as variable-information printing (VIP) or VI or variable data publishing). VDP is a form of on-demand printing in which elements such as text, graphics and images may be changed from one printed piece to the next, without stopping or slowing down the printing process and without using information from a database or external file. For example, a set of personalized letters, each with the same basic layout, can be printed with a different name and address on each letter, while retaining other common elements, such as images, text, associated drop shadows, or other common elements. Variable data printing is typically used for direct marketing, customer relationship management, advertising and invoicing on self-mailers, brochures, or postcard campaigns, but may also be used for a range of other printing applications where customization is required. An article describing VDP entitled "Speaking in Tongues: Sorting Out Variable Data Printing Languages" by Eliot Harper, incorporated by reference herein, is available at http://www.fujixerox.com.au/products/image/media/TSR-0906-Speak-Tongues-reprint.pdf.

VDP printing may be implemented using a language such as Personalized Print Markup Language or PPML, which is described in an article entitled "Introduction to the Personalized Print Markup Language: The PPML Family of XML Standards, available at ppml.podi.org/component/option, com_docman/Itemid,0/task,doc_download/gid, 13&Itemid=/which explains how PPML can be used to implement VDP by caching images and reusing them.

VDP is a direct outgrowth of digital printing technology, which harnesses computer systems, digital printing devices, and specialized software to create high-quality black and white or full color documents with a look and feel comparable to conventional offset printing. Variable data printing enables the mass customization of documents via digital print technology, as opposed to the 'mass-production' of a single document using offset lithography. For example, instead of producing 10,000 copies of a single document to deliver a single message to 10,000 customers, variable data printing provides for printing 10,000 unique documents with customized messages for each customer.

There are two main operational modes to VDP. In one mode, the document template and the variable information are both sent to a Raster Image Processor or Raster Image Processing System (RIP) which combines the two to produce each unique document. The other mode is to combine the static and variable elements prior to printing, using specialized VDP software applications. These applications produce a print job in a programming language format, such as in PostScript or PPML, which organizes the print stream efficiently so that the static elements need only be processed once by the RIP. Consequently, digital printing systems using VDP have become more and more pervasive, while providing high quality, customizable print output on even small office and print shop printing devices. The wide availability of digital pre-print tools such as the Fusion Pro Desktop, designed and sold by the assignee of this application, allow users to generate custom VDP print jobs on a wide variety of print composition computer systems and either print them on their own printing systems or send the print job to a third party printing system to generate the printed output.

Despite the availability of these printing systems and associated software applications, processing of a digital print job at the printing apparatus is often slowed by the need to rasterize images, font effects, and other print features, just before printing, at the RIP. This has the effect of slowing down the overall print throughput and increasing printing costs. Consequently, there is a need in the art for improved systems and methods for enhancing the performance and throughput of digital printing, and in particular enhancing print job raster image processing by using pre-rasterization of print elements based on predetermined printer characteristics.

SUMMARY

The present invention relates to apparatus and methods for providing a pre-rasterized print job for variable data printing (VDP). In one aspect, a set of printer characteristics may be determined and then transferred to a typesetting system. The typesetting system may then pre-rasterize objects of the print job based in part on the received printer characteristics. A pre-rasterized print job, including the pre-rasterized objects and print layout instructions may then be generated, such as in the form of a PostScript file, which may then be transferred to a raster image processor (RIP) for generation of printed output.

In another aspect, a printer characterization file may be used for execution on a printing system to determine the set of printer characteristics, that may include native resolution, rotation angle, compression data and/or other data or information characterizing the printing system.

In another aspect, the present invention relates to a method for enhancing performance in a printing system, comprising receiving a set of printer characteristics associated with a first printer, receiving data defining one or more objects to be incorporated in a print job, rasterizing, based at least in part on the set of printer characteristics, a first object of the one or more objects to generate a first pre-rasterized object and generating a pre-rasterized print job, in a programmed file format, said print job including said first pre-rasterized object and a set of print layout instructions.

In another aspect, the present invention relates to a method for enhancing performance in a printing system, comprising receiving, at the printing system, a printer characterization file including executable instructions to determine a set of one or more printer characteristics of the printing system, executing the instructions on a processor of the printing system so as to determine said one or more printer characteristics and providing, as an output, said one or more printer characteristics.

In another aspect, the present invention relates to a computer readable medium containing processor executable instructions for receiving a set of printer characteristics associated with a first printer, receiving data defining one or more objects to be incorporated in a print job, rasterizing, based at least in part on the set of printer characteristics, a first object of the one or more objects to generate a first pre-rasterized object and generating a pre-rasterized print job, in a programmed file format, said print job including said first pre-rasterized object and a set of print layout instructions.

In another aspect, the present invention relates to a computer readable medium containing instructions for execution on a printing system processor to receive a printer characterization file including a second set of executable instructions, initiate execution of the printer characterization file so as to determine a set of one or more printer characteristics and provide, as an output, said set of one or more printer characteristics.

Additional aspects of the present invention are further described below in conjunction with the appended Drawings.

BRIEF DESCRIPTION OF THE DRAWINGS

The present invention is more fully appreciated in connection with the following Detailed Description taken in conjunction with the accompanying drawings, wherein.

DETAILED DESCRIPTION OF EMBODIMENTS OF THE PRESENT INVENTION

Overview

As noted above, VDP systems facilitate user composition of customized VDP print jobs at the user's print composition system. A typical print job, however, must be sent to a printer which may have any of a variety of printing characteristics. Current printing systems, however, fail to take into consideration the widely variable characteristics of a range of printers, and therefore, print job processing and output dot pattern or bitmap generation may be slowed, in some cases dramatically, when the raster image processor (RIP) is required to convert print job objects such as images, vector content, or other print elements such as drop shadows into the printer's native resolution and/or rotation. In some printing application, such as the Fusion Pro Desktop tools offered by the assignee of this patent application, characteristics of a specific printer may be pre-coded into the application to provide printer specific pre-rasterized output and/or rotation; however, this functionality is limited to specific hard-coded printer characteristics. More specifically, these systems do not calculate or determine the rotation angle for the printer, which is the angle of the paper flow relative to the frame buffer. In addition, these systems do not pre-rasterize images set at rotation angles other than 0, +/−90 degrees or 180 degrees.

In various embodiments, the present invention addresses these and other problems with current printing systems by providing systems and methods for dynamically determining a set of characteristics of a particular printer, providing the characteristics to the composition or typesetting system, generating a print job including programmed instructions for generating the printed output along with pre-rasterized print objects, providing the print job to a printing system, generating, based on the print job program instructions and pre-rasterized objects, printed output, as well as providing other potential advantages.

Typical Printing System Configuration

Figure 1A:
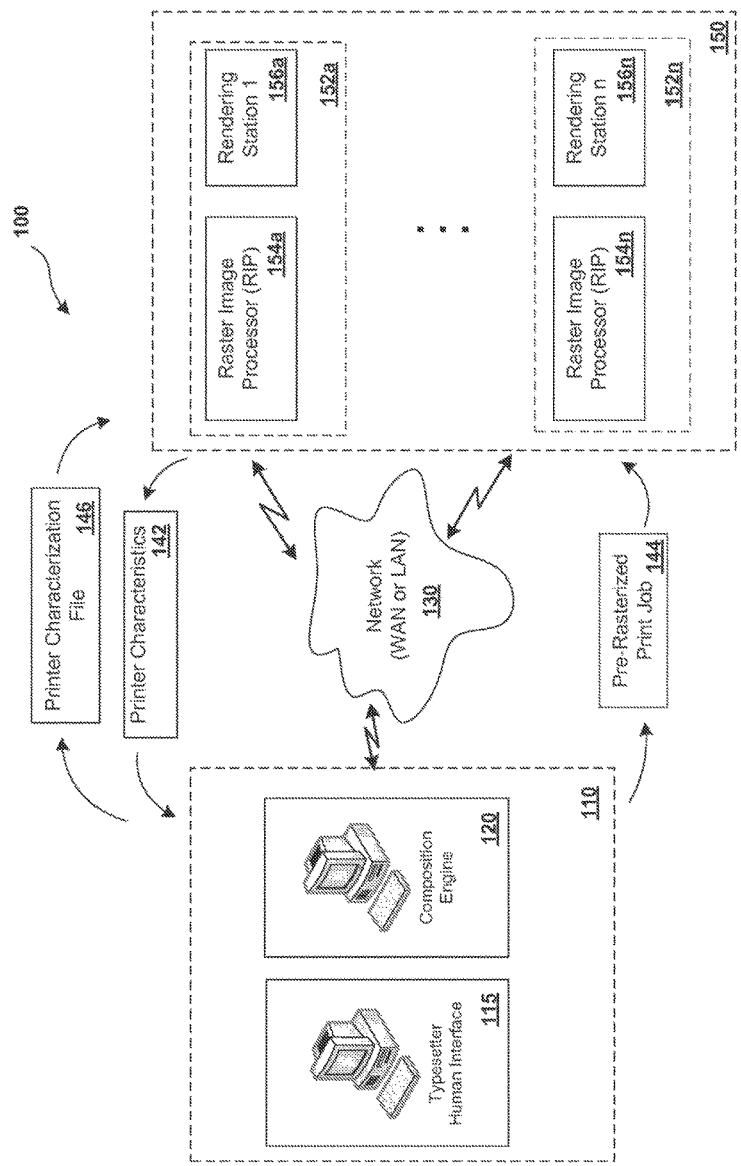
FIG. 1A is an illustration of a typical printing system on which embodiments of the present invention may be implemented.

In order to further describe details of various embodiments of the present invention, attention is now directed to FIG. 1A which illustrates a typical digital printing system 100 on which various embodiments of the present invention may be implemented. Printing system 100 includes two primary sub-sections—a composition or typesetting subsection (also denoted herein as composition system or typesetter) 110 and a printing subsection (also denoted herein as a printing system) 150. These subsections may be interconnected via a network 130 as shown in FIG. 1A, such as a local area network (wired LAN, such as an Ethernet or other LAN), a wireless network, a wide area network (WAN), such as the Internet, a corporate network, or via other networking configurations. In some embodiments, subsections 110 and 150 need not be directly interconnected as shown in FIG. 1, but data and information may be transferred manually between them, such as by human users or operators. Data and information transferred between sub-systems 110 and 150 may include a set of printer characteristics 142, a print job 144, a printer characteristics determination file 146, as well as other data or information (not shown).

Composition subsection 110 may include two computer sub-systems 115 and 120. Sub-system 115 is denoted herein as a typesetter human interface and is typically a computer system containing hardware and software configured to receive printer characteristics 142, which include information associated with the characteristics of a particular printer system (or systems) 152, store that information in a memory, and provide connectivity facilitating access to that information to sub-system 120 or transfer the received information to sub-system 120. Sub-system 115 may also be configured to communicate directly with printing subsection 150 to generate a printer characteristics determination file 146 to query for printer characteristics 142 of one or more printers 152a-152n, and/or other information, and receive printer characteristics 142 from the printing subsection 150.

Sub-system 120 is denoted herein as a composition engine or typesetter system, and it is configured with hardware and software to allow a user to compose a print job using a printing composition or typesetting tool such as Fusion Pro Desktop or another similar or equivalent tool. In some embodiments, the components and functionality associated with typesetter human interface 115 (also denoted herein as "interface" 115 for brevity) and composition engine 120 may be combined in a single computer system rather than in the form of separate sub-systems as shown in FIG. 1A. In this case, the combined system may be referred to herein merely as a typesetter or typesetter system 110.

In addition to supporting functionality associated with composition of print jobs as may be provided by an application such as Fusion Pro, composition engine 120 may also be configured to execute additional functions as may be implemented in one or more functional modules, as further described herein, to receive printer characteristics and generate one or more pre-rasterized print jobs 144 for execution on one or more printers 152a-152n of printing system 150. As used herein, a pre-rasterized print job describes a print job, typically in the form of a printer programming language such as PostScript, that includes instructions for generating the printed output along with one or more pre-rasterized objects (such as images, fonts, drop-shadows, other vector objects, etc.). Embodiments of this functionality and associated implementation details for embodiments are further described below.

Printing system 150 includes one or more printers 152a-152n and may also include other hardware or software elements (not shown). Each of these printers 152 may further be divided into a raster image processor module (RIP) 154 and a rendering station module 156. RIP 154 is typically a computer system configured to receive a print job and generate the specific page printing bitmap or page dot pattern for rendering (i.e., generating the printed output) on rendering station 156. As is known in the art, each printer has a native output resolution or resolutions at which the printed output is generated. The printed output consists of printed dots or other very small printed features, with the dots placed on the page by a print rendering apparatus of the rendering station 156. For example, the dots may consist of inks, toners, or other print media placed on the printed page by ink jets or thermal mechanisms, at the printer's native resolution. The native resolution defines the particular dot pattern of the printed output that can be produced on the particular printer's rendering station. In effect, any raster objects of an incoming print job are converted by the RIP into a page layout in the printer's native resolution, irrespective of the specific original resolution of the object. This requires that objects such as images be converted from their initial resolution to the printer's native resolution.

In addition, the rotation of the object on the page may vary based on the particular printer's page layout, how the printed pages are configured on the printed sheet (for example, some printed pages may be oriented horizontally on the page, whereas other pages having the same content and objects may be rotated 90 degrees or 180 degrees to maximize printable area of the output), and/or based on variable rotation of printed objects, beyond just fixed +/−90 or 180 degree rotations.

When a print job is provided to the printer, such as printers 152a-152n of FIG. 1A, the RIP 154 receives the print job, typically in the form of a printer programming language file such as Adobe PostScript, and generates all or part of the printed page in the native printer resolution and rotation. As noted above, this processing may include converting an object from the print job from one resolution to another, generating a raster object in the printer's native format from a vector object such as a font, drop shadow, etc., rotating objects based on the desired print orientation or rotation, and/or other processing such as is further described and illustrated herein.

To further elaborate on details of processing as may be performed by the RIP 154, a RIP is a component of a printing system that generates a rasterized page layout for printing based on an input print job. The page layout is then sent to a print rendering device, such as rendering station 156 as shown in FIG. 1A, for generation of the printed output. The print job input is typically in the form of a page description in a high-level page description language such as PostScript, Portable Document Format, XPS, and the like. These print jobs include a set of programming instructions that describe how to generate the particular print job as well as specific objects (components) of the print job, such as images, fonts, drop shadows, vector elements, etc. that may be needed to produce the printed output. The RIP performs data processing to convert a print job file (such as, in an exemplary embodiment, a PostScript file) from the programming language description of the printed page to a dot pattern page layout for rendering the page in the native output resolution and rotation.

A RIP can be implemented as a software component executing on a computer system, such as RIP 156 of FIG. 1A, or as a firmware or software program executed on a microprocessor, DSP, ASIC or other hardware inside a printer. RIP software may be optimized for VDP or may not be VDP-aware, depending on the type of print tasks at hand. Both types of RIP technology are widely available from software vendors such as EFI and Harlequin, and from printer vendors such as Hewlett-Packerd, Nexpress/Kodak and Xerox. For high-end and intermediate digital typesetting standalone hardware RIPs are typically used. PostScript printers contain an associated PostScript RIP either in hardware/software elements or in firmware. One advantage of the present invention is that it operates on RIPs that are not VDP-aware such as office printer equipment made by companies such as Ricoh and Canon.

As noted above, a RIP is required to generate raster elements of printed pages as well as to convert raster objects provided at a particular resolution and rotation into the printer's native resolution and rotation. Various techniques for performing these transformations are known in the art, however, this processing can become very computationally intensive as well as time consuming when done at the RIP. Consequently, if the processing requirements are sufficiently large, the RIP may not be able to keep up with the output speed of the rendering station of the printer system, which can slow down the printing output and affect overall printing efficiency.

For example, in the system of FIG. 1A, if a print job generated at composition engine 120 includes a number of image objects in a raster format (such as, for example, JPG, TIFF, etc.) at a high resolution and specific rotation and the final printed output size and associated native resolution of the rendering station requires a different resolution and/or rotation, the RIP 154 must convert the images to the new resolutions and/or rotations. If the RIP 154 cannot perform this processing fast enough, the rendering station 156 must pause or slow down the output, reducing overall printing throughput.

In order to address this problem as well as provide other potential advantages, various embodiments of the present invention facilitate offloading of the processing required by the RIP 154 to the composition system 120 so as to improve overall printer system throughput.

Typical Printing Process Workflow

Figure 1B:
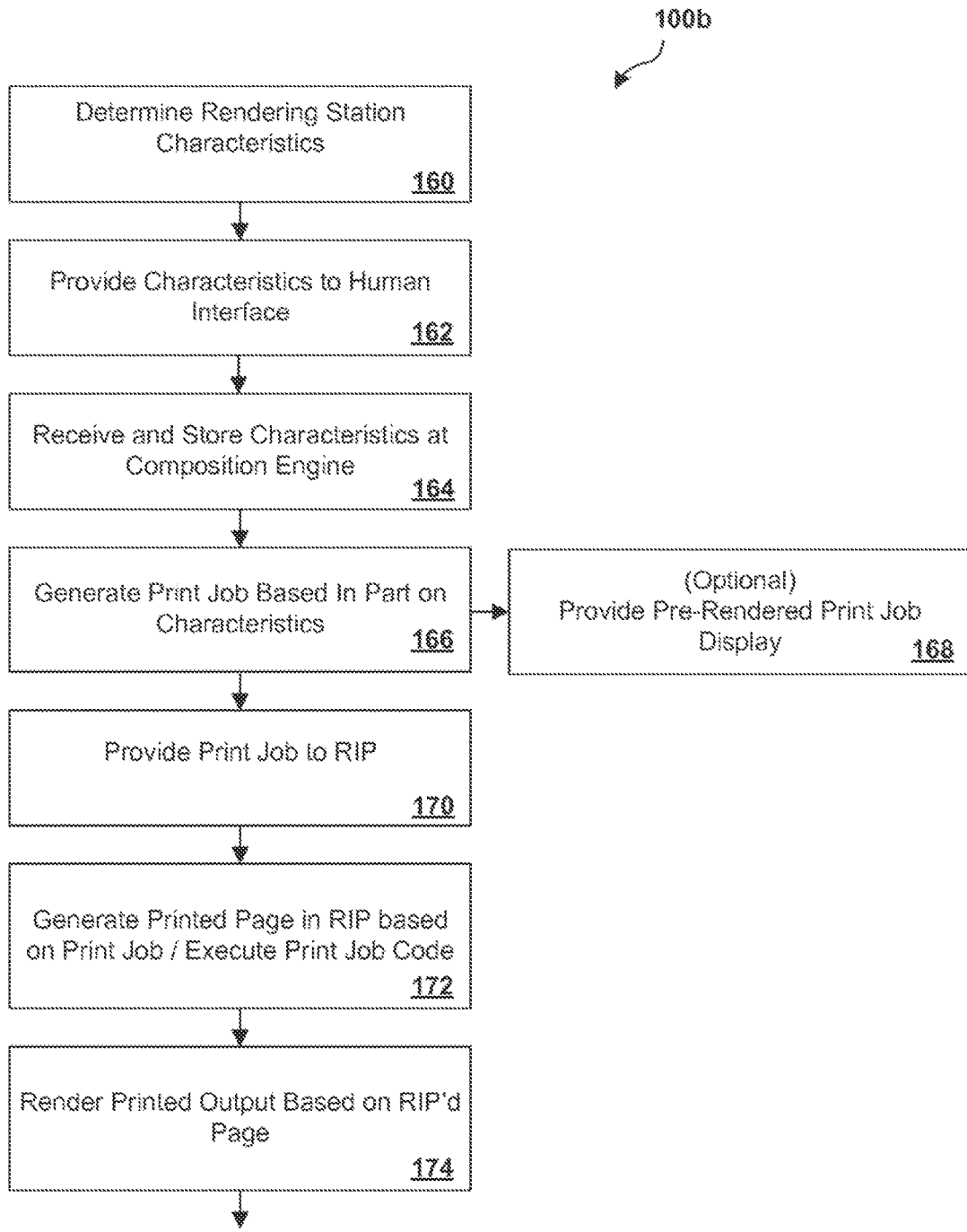
FIG. 1B is an example workflow for print processing in accordance with embodiments of the present invention.

Attention is now directed to FIG. 1B which illustrates a representative print job processing workflow as may be performed by embodiments of the present invention. As shown in FIG. 1B, the print job processing workflow may begin with stage 160 where characteristics of the particular printer system's rendering station 156 are determined. This may be done by providing a printer characteristics determination file 146 to the printing system to execute instructions on the printer(s) 152 to determine their characteristics. These characteristics typically include native resolution as well as rotation for printed output. As noted previously, different printers have different resolutions and output orientations, and existing printing systems do not dynamically determine these characteristics for arbitrary printer types.

Determination of the printer characteristics may be done by providing the printing system printer(s) 152 with pre-programmed executable code or instructions, such as in the form of a PostScript file or other executable file or script 146 (such as, for example, a print file in a scripted typesetting language such as DataLogix, etc.), that then instructs the printer to generate output at the native resolution and/or generates data defining the printer's output characteristics. The resulting output data may be "hidden" from direct view by providing an encoded output with the printer characteristics embedded so as to preclude a user from readily determining the printer characteristics by inspection of the output.

Figure 10:
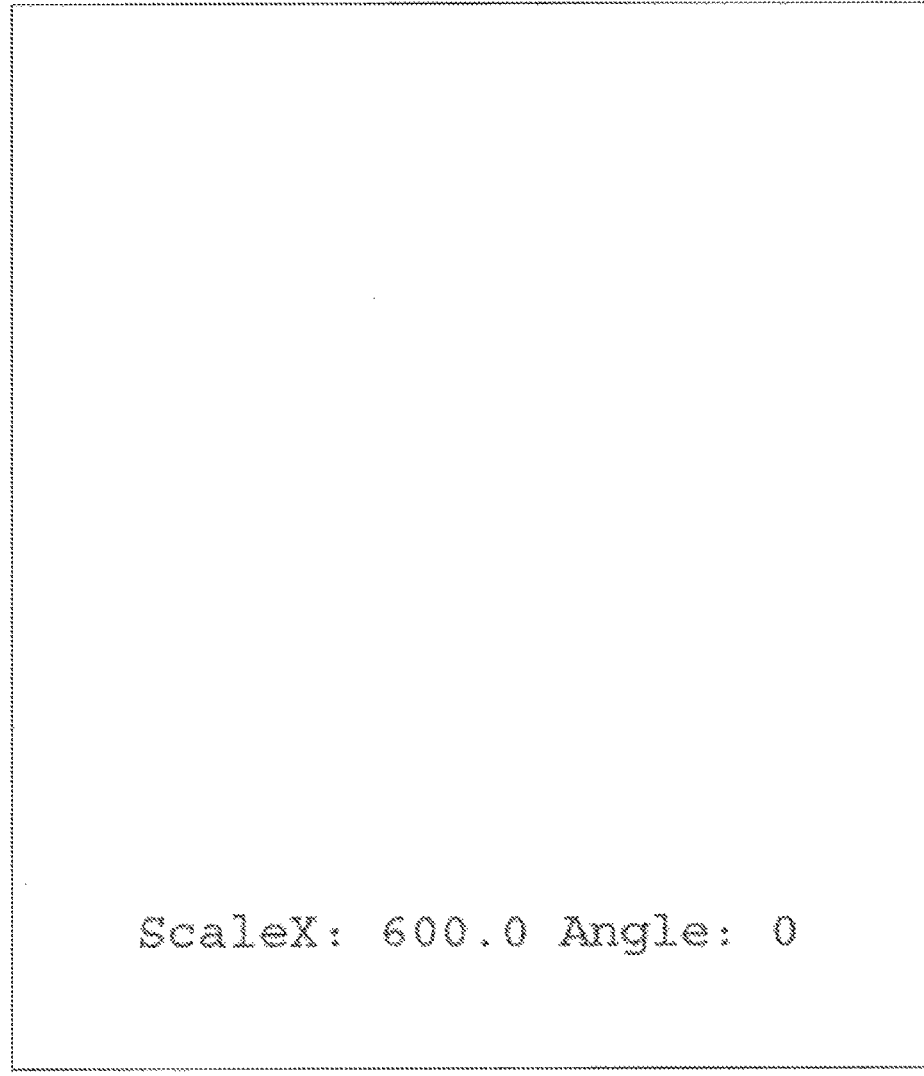
FIG. 10 is an example printed output from PostScript printer resolution and rotation test code, in accordance with aspects of the present invention.

In some embodiments, the printer characteristics 142 may be provided on a paper or other printed output. In other embodiments, the printer characteristics may be provided in the form of a digital data file that can be transferred to a digital data storage medium for manual transfer to the typesetter 110 and/or electronically transmitted to the typesetter 110. In any event, the printer characteristics are typically determined by executing a pre-programmed series of instructions, provided by or from the composition engine, on the printers 152, and then receiving, from the printers 152, an output that includes the printer characteristics 142. Example code for implementing this is described later herein and an example output from an implementation of the example code is shown in FIG. 10.

In addition to native resolution and orientation, other printer characteristics may include data characterizing RIP performance, such as the ability to decompress compressed bitmap files, speed or timing of image decompression, and/or other RIP performance characteristics that can be determined by configuration, query or computation, including size of memory, hard disk (or other storage media) available space, PostScript language level, available fonts, ability to handle partially transparent images, and so forth.

Figure 9:
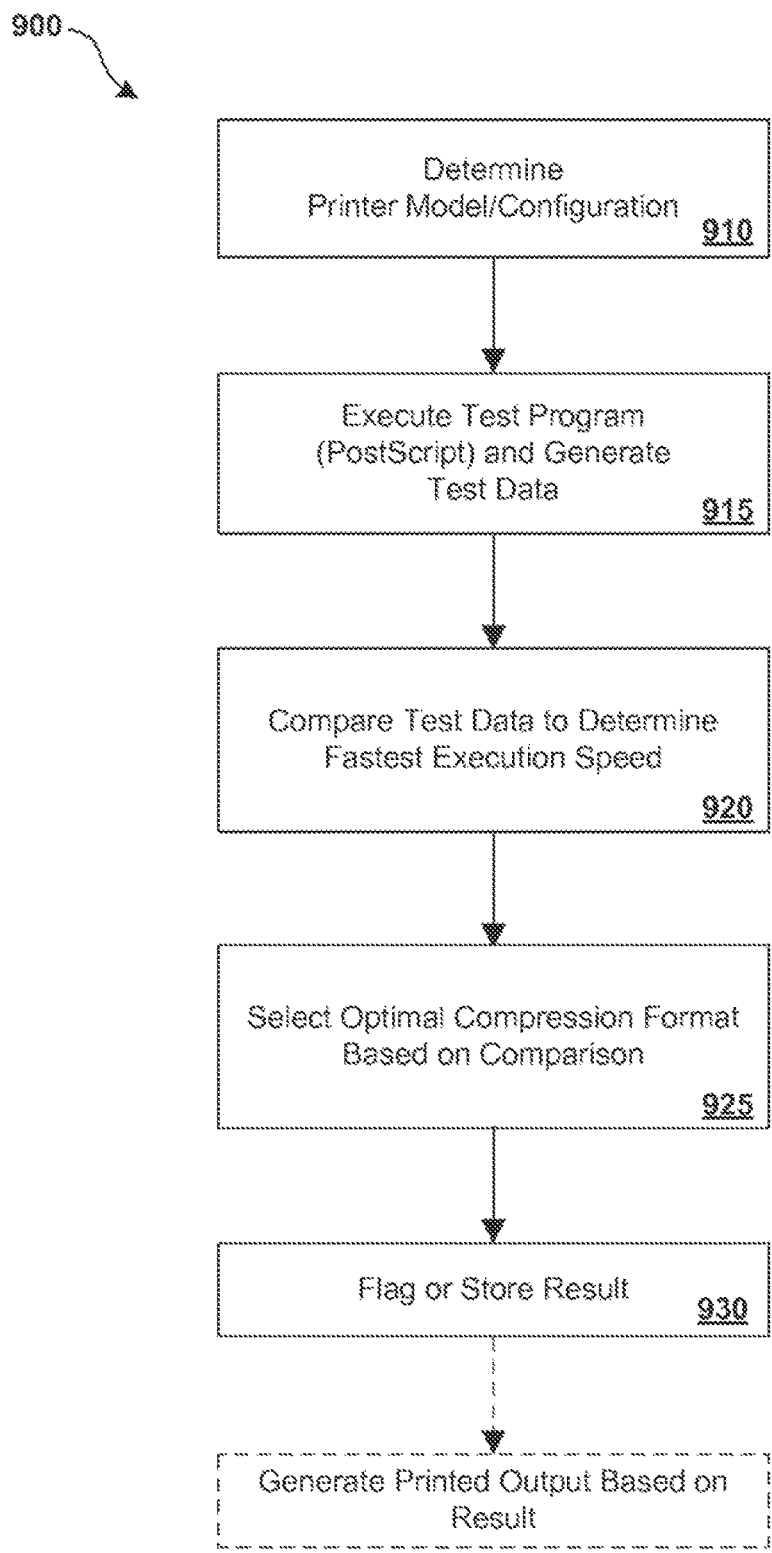
FIG. 9 is an illustration of one embodiment of a process for determining an optimal compression, in accordance with aspects of the present invention.

For example, the PostScript (or other executable file) may include instructions to time the RIP while decompressing a compressed bitmap image file (such as, for example, timing decompression of a JPG or TIFF compressed image) to determine the speed at which the RIP can perform this processing. This characteristic may be advantageous in determining whether to provide pre-rasterized objects, such as images, from the composition engine to the RIP in a compressed form versus an uncompressed form. In addition, testing RIP image decompression timing may be helpful in determining an optimal image compression based on the RIP's decompression ability and speed. One implementation of a logical flow for testing of RIP performance with image decompression is shown in process 900 of FIG. 9 and described below.

In this embodiment, at a first stage 910 the printer model is identified and the printer's hardware configuration is determined. Once this is done, a test program, preferably in the form of a PostScript program, is provided to the printer and executed on the printer's software at stage 915. In operation, the PostScript program compresses and decompresses images by writing the compressed image to the storage medium on the printer or associated with the printer and referring it to the RIP, and then by writing the decompressed image to the storage medium and referring it to the RIP. This operation is typically performed for both memory, local hard disk, and (if the RIP is so configured) network disk storage or other external storage media. At stage 920, the timing for each operation is compared to determine the relative speed of reading the image from each storage medium and rendering it in the RIP. Based on this comparison, a determination is then made at stage 925 as to which is the optimal/fastest speed (i.e, rendering of the compressed or decompressed images). A flag or other indicator may then be returned at stage 930, or a memory location or other marker may be set indicating the faster response and/or including other performance data such as relative speeds or timing, etc. In operation, storage and/or transmission of media in compressed or uncompressed format may be determined based on the test results (storage of images is typically done to a temporary storage location associated with the RIP). This approach may provide non-intuitive advantages, such as when overall throughput is improved based on providing non-compressed images as opposed to compressed images (which would typically be provided). In addition, this process may be repeated for different levels of compression, so as to determine an optimal level of compression for a particular print job and/or printer (rather than just comparing compressed versus uncompressed images).

Once the printer characteristics 142 have been determined, this information may then be provided to the typesetter 110, such as via human interface 115 of FIG. 1A, at stage 162. The received printer-specific configuration information may then be stored in the human interface 115 and/or transferred to the composition engine 120 for storage therein at stage 164. As noted previously, human interface 115 and composition engine 120 may be combined into a single typesetter 110.

In some embodiments, human interface 115 or typesetter 110 may include a user interface, such as a graphical user interface (GUI) or other interface, to allow a user to manually enter the printer characteristics 142 provided by the printing system 150 and specific printer(s) 152. For example, the printing system 150 may provide the printer characteristics of one or more printers 152 on a hard copy printout, with this information then manually entered at the human interface 115 at stage 162. Alternately, the printer characteristics 142 may be stored electronically on a digital storage medium such as a disk, CD, DVD or other similar media, USB Flash device, or other portable drive, or via other digital storage media, for transfer to typesetter 110. In addition, the printer characteristics 142 may be electronically transferred, via the network 130, to the typesetter 110 at stage 164.

In any case, once the printer characteristics 142 have been received at the typesetter 110, they may then be stored in a memory at stage 164, where they may then be provided to or made accessible to a composition application, such as Fusion Pro Desktop or another composition application, to be used to generate a print job including one or more pre-rasterized output objects at stage 166 as is further described below. This may be done in the form of a plug-in or other modular mechanism to provide the pre-rasterization functionality to an existing composition application.

In addition, in some embodiments the printer characteristics may also be placed in a file or database associated with, available to, or otherwise accessible by one or more composition application or workstations. For example, this database may be part of a shared computer/server system that can be accessed by multiple users/composition application over a network such as a local area network or a wide area network (such as the Internet). There may be several advantages to having the printer characteristics stored in this manner for reference purposes, including uses to confirm results and/or ensure that the composition of a given document will operate optimally for a given RIP and printer model. For example, These advantages may include: 1) a user may be able to acquire and confirm characteristics for a given printer against a database (or other collection) of stored values; 2) a user may also be able to update the file with new values or settings, additional printer models, or other relevant parameters or data; 3) a user may be able to submit jobs with a customer printer angle and resolution based on a particular printer model and identifier, even if a query to the printer for its current values fails (the values will typically rarely change for a given printer model); 4) a composition application (or the user/composer) of a document can choose a device from the file and apply printer characteristics to image processing without running a PostScript program, doing a manual check, or relying on default values, or where those steps are not available; 5) different compositing applications or workstations can use and add to the database (if it is configured to user access and editing); 6) a user may be able to associated printer characteristics with a new printer in the database, based on the printer's module number, if the model's characteristics are already stored. Other advantages may also be provided by such a configuration.

In an additional optional step 168, the pre-rasterized print job 144 may also be provided to a display output device, such as to a monitor, for display of the pre-rasterized output in the native format of the specific printer 152. For example, composition engine 120 and/or human interface 115 may include a monitor, such as an LCD monitor or other display device as are known or developed in the art. The pre-rasterized output may then be displayed on the display device, in the printer's native resolution and rotation, so as provide a highly accurate view of how the final printed image will appear on the printed output. This may provide advantages since current systems do not allow users to view, at the compositioning stage, what the final printed output will look like at the native resolution of the specific output printer.

The print job 144 may then be provided to the printer system and RIP for the specifically characterized printer 152 at stage 170. This may be done by electronic transfer of the print job 144 via network 130 and/or via manual transfer of the print job 144 from typesetter 110 to printing system 150. In either case, the print job 144 will include program instructions for execution on the RIP to generate the printed output, along with one or more pre-rasterized objects generated in the composition engine based at least in part on the specific printer characteristics 142. In some embodiments, the print job 144 may also include original objects that have not been pre-rasterized. For example, the print job 144 may include both pre-rasterized image objects along with the corresponding image object in its original resolution and rotation. This may be helpful if the print job 144 is sent to a different printer than the targeted printer and/or if the printer characteristics otherwise do not match the pre-determined printer characteristics 142. For example, if the characteristics do not match, the RIP can still process the document using the unrasterized version of the image (at the unrasterized print output speed).

As described further below, instructions for testing for such a match may be incorporated into the print job as programming instructions for execution on the RIP. For example, PostScript code (or other executable code) may be included in the file to process in the RIP such that the print angle and resolution are requested, and a match to the setting provided by the composition application is confirmed. If these is no match, standard PostScript image settings may be applied (i.e., as would be processed without RIP optimization). If a match is found, then the optimized rasterization images are used by the RIP.

At stage 172, the RIP will then generate all or a portion of a printed page in the printer's native resolution and/or rotation based on the print job 144. This stage includes using, to the extent possible, pre-RIPed objects, such as pre-RIPed image bitmaps that are generated at the composition engine in the printer's native resolution and/or rotation. As noted previously, the print job 144 will include these pre-RIPed objects. At the time of print job execution, the printing process is controlled by the executable instructions include in the print job 144, such as, for example, executable instructions defining the print job layout provided in the print job 144 in PostScript format as well as position and orientation of the pre-RIPed objects.

At the final step, at stage 174, the printed output is rendered (i.e., printed) on the selected output media based on the printed page layout generated by the RIP in response to the provided print job 144.

Typical Typesetter/Composition System Configuration

Figure 2:
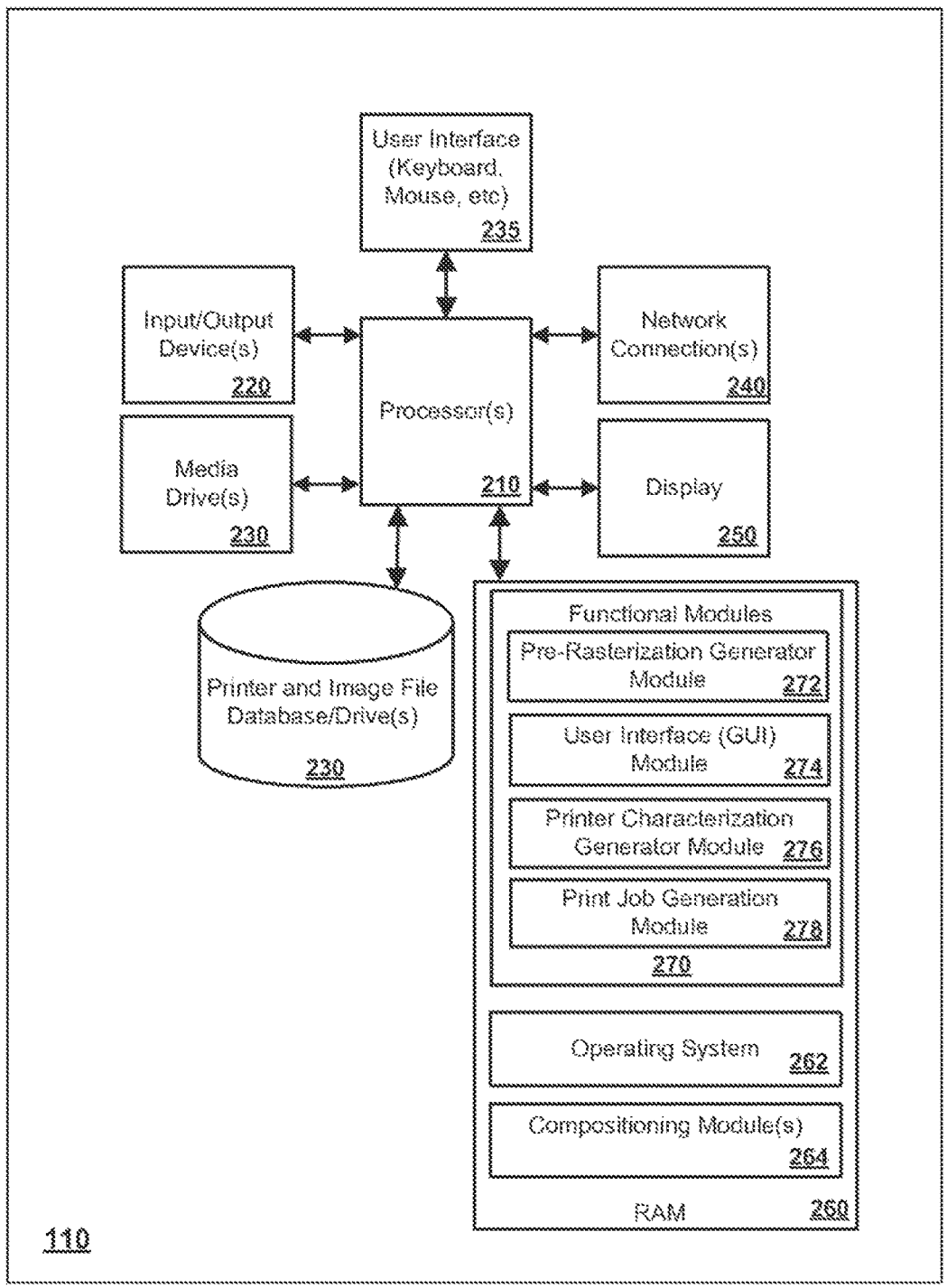
FIG. 2 is an illustration of an embodiment of a Composition/Typesetter System in accordance with aspects of the present invention.

Attention is now directed to FIG. 2, which illustrates a typical system configuration for a composition system or typesetting system, such as typesetter 110 as shown in FIG. 1A. For purposes of brevity, the various components of FIG. 2 are shown in a simplified form, with some elements removed for purposes of clarity. For example, FIG. 2 illustrates components of a single computer system, however, two separate systems 115 and 120 may also be used as shown in FIG. 1A, and/or other configurations may also be used.

Composition system 110 includes one or more processors 210, one or more memories or other program and data storage elements 260, and an image/content database 230, which may be part of memory 260. Memory 260 further includes functional modules for providing the various functionality as is described herein. These functional modules may include hardware elements, software elements, firmware elements, and/or combinations of these elements to implement various functionality. In particular, the functional modules may include a Pre-Rasterization Generator Module 272, a User Interface Module 272, a Printer Characterization Module 276, a Print Job Generator Module 278, and/or combinations of these various modules as well as other modules. In addition, memory 260 may include one or more operating systems 262 or other applications (not shown), as well as a compositioning module 264, which may be, for example, the Fusion Pro Desktop or another composition or typesetting application program. The functionality provided by the functional modules 270 may be incorporated into the compositioning module 264, such as via direct integration or via plug-ins or other incorporation mechanisms. In addition, compositioning module 264 may be a standalone application or may be integrated into another application, such as in the form of a plug-in or via other program integration mechanisms.

Composition system 110 may also include other elements such as one or more media drives 230 (removable hard disk drives, CD, DVD, BD drives, Flash memory drives, USB drives, and the like) to facilitate input, output and storage of print jobs, printer characterization data, image files and/or other data or information. In addition, composition system 110 may include one or more I/O devices 220, such as USB or Firewire interfaces, one or more user interfaces and associated hardware and/or software, such as keyboards, computer mice, trackballs, and the like, one or more network connections 240, such as wired or wireless network connections (Ethernet, Wi-Fi, etc.) to facilitate connectivity to other systems, such as printing system 150. A display 250, such as a CRT monitor, LCD monitor, or other visual output device may also be included to facilitate data and information input and output, user interface functionality, as well as to provide a composition interface and/or a display mechanism for viewing pre-rasterized page layouts or pre-rasterized objects in the printer's native resolution.

Figure 3:
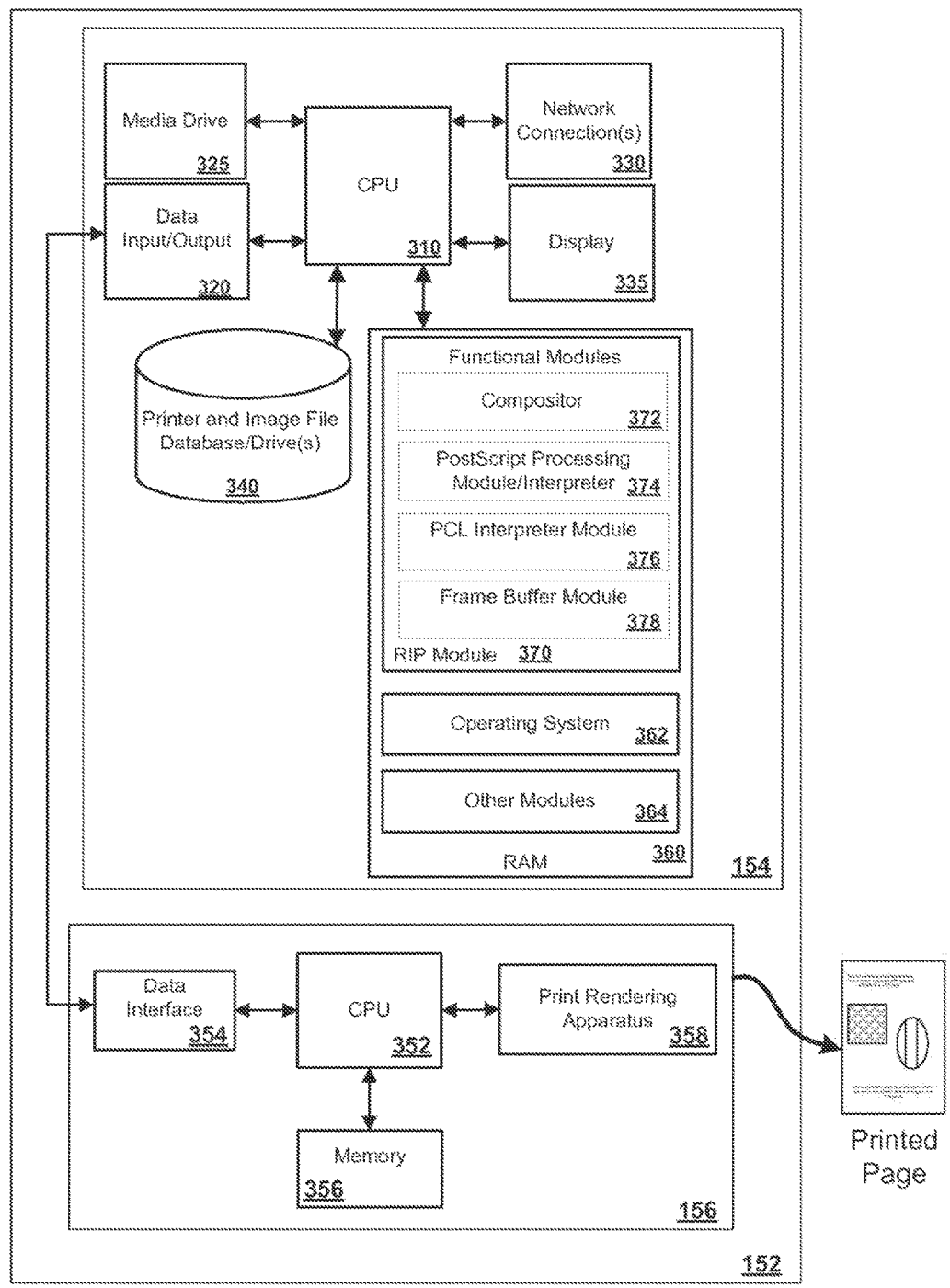
FIG. 3 is an illustration of an embodiment of a Printer System in accordance with aspects of the present invention.

Attention is now directed to FIG. 3 which illustrates a typical printer system configuration. Printer system 152 as shown in FIG. 3 may be a single printer or one of a plurality of printers in a printing system 150 as shown in FIG. 1A As described previously, printer system 152 includes a RIP module 154 and a rendering station module 156, and may include other elements (not shown). RIP module 154 may include one or more processors or CPU's 310, one or more data I/O modules 320 configured to interface between RIP 154 and rendering station 156, and a memory 360. Memory 360 further includes functional modules for providing the various functionality as is described herein. These functional modules may include hardware elements, software elements, firmware elements, and/or combinations of these elements to implement various functionality.

In particular, in a typical embodiment, the RIP may be in the form of a RIP software module 370 comprising a set of functional modules that may include a Compositor Module 372, one or more programming job processing modules such as a Postscript Processing Module 374, a PCL Interpreter Module 376 and/or other print job processing modules configured to generate a page layout based on a received print job. In addition, the functional modules may include page or frame buffer modules configured to store native page or frame information for transmission to the rendering station 156.

For example, frame buffer module may include a complete page in a dot pattern form that can be directly converted to printed output by the print rendering apparatus 358. Other functional modules such as operating system module 362 may also be stored in memory 360.

In addition, RIP 154 may include a database 340 that may be integrated with memory 360. Database 340 may be used to store data, information and objects such as are described herein, including pre-rasterized objects and objects provided in the print job to be rasterized by the RIP module 370. The compositor module 372 may be used for taking output from a PostScript interpreter 374 and PCL module 376 and combining them with other page elements in the frame buffer 378 to account for transparency, where supported (frame buffer 378 stores a bitmap of the printed output, and data loaded into the frame buffer as "transparent" will allow other data in the buffer at the same pixel location to show-through). RIP 154 may also include network connection module(s) 330 to facilitate network connectivity such as to typesetter 110 or to other systems or devices, as well as one or more media drives 325 (removable hard disk drives, CD, DVD, BD drives, Flash memory drives, USB drives, and the like) to facilitate input, output and storage of print jobs, storage and output of printer characterization data, image files and/or other data or information.

Rendering station 156 is configured to receive formatted page information, such as a page dot pattern, from RIP 154 and generate the printed output page in the print rendering apparatus 358's native resolution. While rendering stations 156 may have different configuration based on the type of printer system they are incorporated in, they will generally include at least a processor 352 or logic circuit equivalents such as a PLD, ASIC, etc., as well as memory 356 for storage of incoming data, and a print rendering apparatus 358 which generates the printed page output (such as by laser, ink jet, etc.).

Determination of Printer Characteristics

Figure 4:
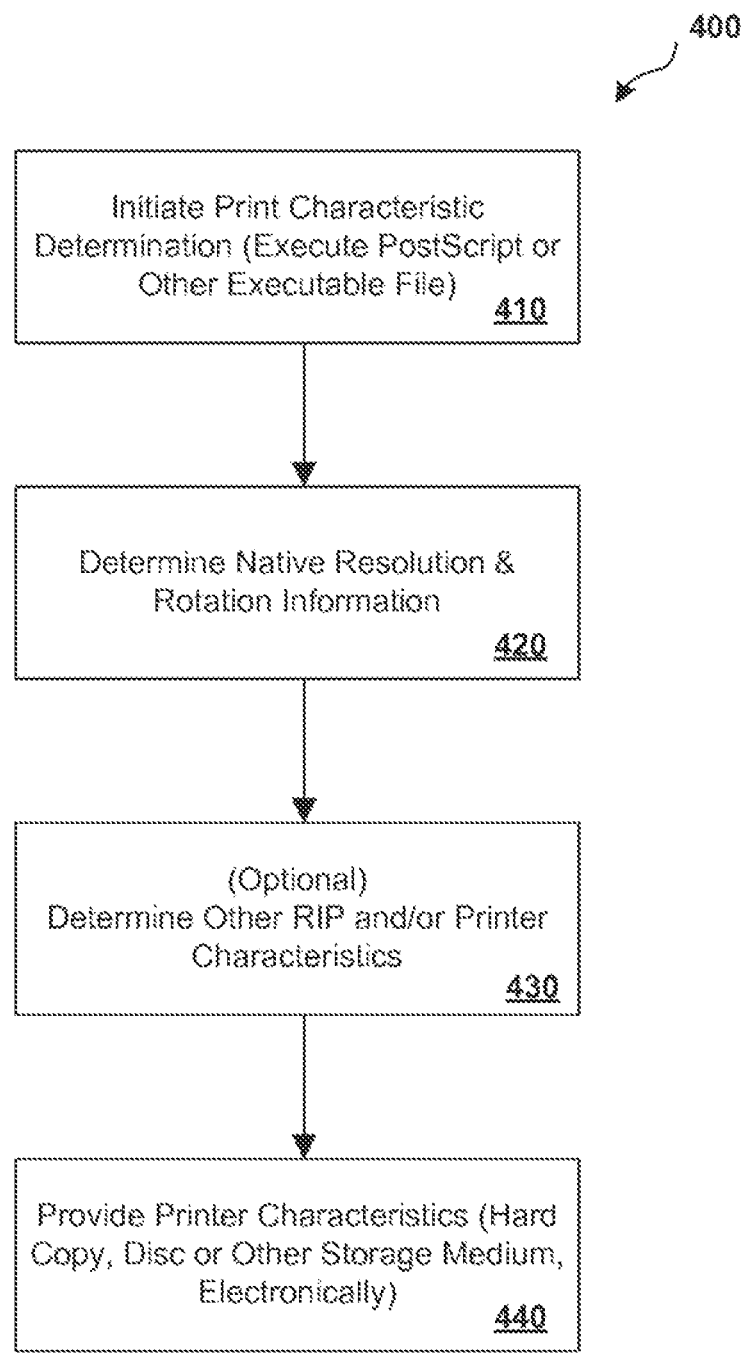
FIG. 4 is an illustration of an embodiment of a process for determining a set of printer characteristics in accordance with aspects of the present invention.

As described previously, a first step in print job processing in accordance with various embodiments of the present invention relates to determining a set of printer characteristics 142 for the particular printer to be used for the print job. This functionality may be done in several ways. For example, FIG. 4 illustrates one embodiment of a process 400 for implementing this functionality. At stage 410, determination of printer characteristics 142 is initiated. This may be done by providing an executable file 146 to the RIP which includes instructions to determine the printer characteristics. In an exemplary embodiment, the executable file 146 is a Postscript file that may be provided automatically to the RIP 154 from typesetter 110 via network 130, and/or may be provided manually to the RIP 154 by a user. This file may be generated by a printer characterization generator module 276 as shown in FIG. 2, which includes instructions to generate the executable file 146 in a programmed instruction format, such as PostScript.

The executable file 145 (PostScript file) includes one or more sets of instructions to direct the printer to generate printer characteristics. For example, at stage 420 the instructions may include instructions to generate printer characteristic data corresponding to the printer's native resolution and/or rotation angle. This data may then be stored in a memory of the RIP 154. Additional printer characteristics may be determined at optional stage 430, such as determination of printer decompression timing (decompression timing versus file type, such as JPG vs TIFF, decompression timing versus degree of compression, etc.). This would be done in the course of, or added to, the process stages for testing the RIP as described previously herein.

At stage 440 the printer characteristics may then be provided as output for transfer to the typesetter 110. For example, output may be provided in the form of a printed page including the printer characteristics 142. The data may be provided in an encoded form so as to avoid direct determination of the generated data, and/or to facilitate manual entry of the data into the typesetter 110. Alternately or in addition, the data may be provided on a digital data storage medium such as magnetic media, a CD, DVD, BD, etc., a file on a Flash or other drive, or on other digital storage media. In addition, the file may be transferred electronically from printing system 150 to typesetter 110 such as via the network 130 or via other electronic connections.

In any case, the printer characteristics 142 as generated in the RIP are provided to the typesetter 110/composition engine 120 for use in pre-rasterizing a print job based at least in part of the printer characteristics 142. The pre-rasterized print job 144 may then be transferred back to the printer 150 for output rendering on one or more printers 152a-n.

In an alternate embodiment, a set of printer characteristics 142 may alternately be generated in advance for a set of printers 152, such as by executing the printer characterization file 146 on test printers or providing the printer characterization file to printer manufacturers, sellers, etc. to generate the printer characteristics. A collection of these printer characteristics for a plurality of printers may then be stored in a database and/or integrated into a composition application such as Fusion Pro Desktop so as to avoid the steps of generating the printer characteristics at or near the time of print job execution. This approach may provide advantages in integrating a large set of printer characteristics into the composition application, however, it may also have disadvantages because it would require continual updates of printer characteristic information into the composition application for new printers as they become available.

Generation of Pre-Rasterized Objects and Print Job

Figure 5:
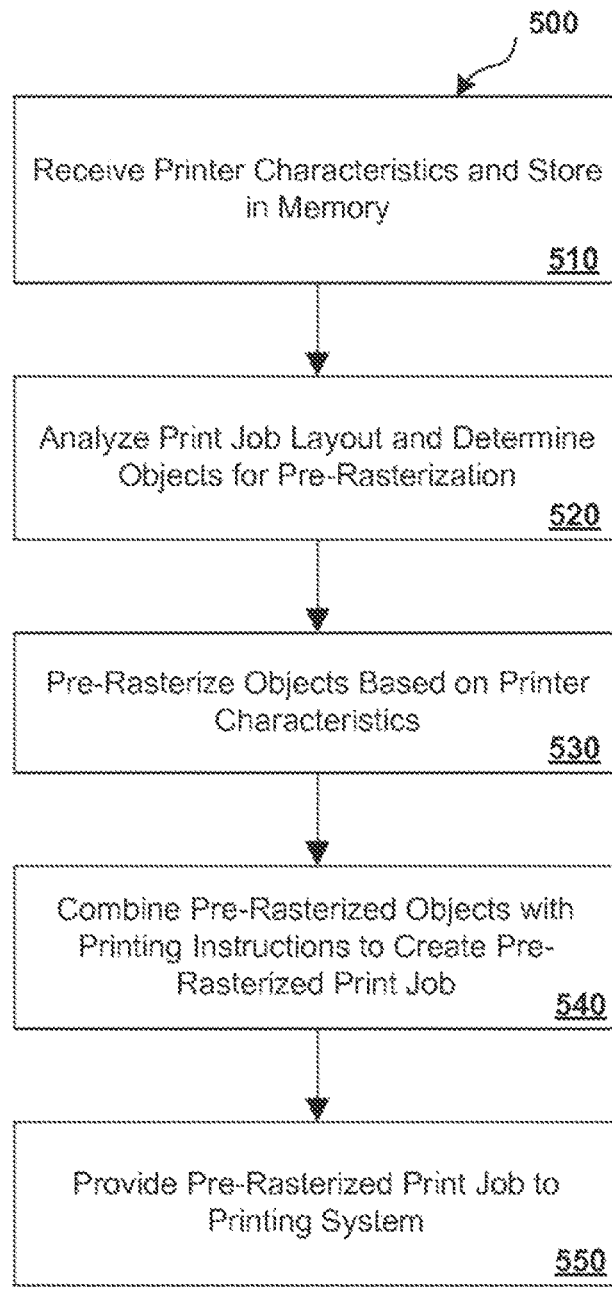
FIG. 5 is an illustration of an embodiment of a process for generation of a pre-rasterized print job in accordance with aspects of the present invention.

Attention is now directed to FIG. 5, which illustrates an embodiment of a process 500 for generating a pre-rasterized print job 144 such as is shown in FIG. 1A. As noted previously, the pre-rasterized print job 144 includes one or more pre-rasterized objects generated based on a set of specific printer characteristics 142 received and stored in typetter 110. These printer characteristics may be generated by a process such as process 400 illustrated in FIG. 4, or by another similar or equivalent process. They may also be supplied as part of a printer database or other printer configuration information file or document.

At stage 510, printer characteristics 142 are received at a typesetter 110/composition engine 120 and may be stored in a memory for access by the composition application and/or print job generation modules such as modules 270 as shown in FIG. 2.

At stage 520, the print job may be analyzed by one or more of modules 270 to determine which objects are suitable for pre-rasterization based on the received printer characteristics. Modules 270 may include instructions to analyze the print job layout generated by the composition application(s)/composition modules 264 and determine objects in the print job that are suitable for pre-rasterization in the printer's native resolution and/or rotation. These objects may include image objects, graphics, printer effects such as drop, transparency or shading elements, and/or other raster or vector objects. The processing generates as output PostScript code (or other executable code) for the typesetter/printer by analyzing the objects, determining a set of objects for pre-rasterization, determining the printer resolution and angle of rotation, and generating an output file based on the information. In summary, the print job is analyzed to determine which objects to pre-rasterize so as to improve printer performance, with the pre-rasterized objects referenced in the PostScript code, along with (typically) the associated unrasterized objects.

Once the print composition is analyzed and objects suitable for pre-rasterization have been identified, the objects may then be converted at stage 530 to the printer's native resolution and rotation as determined by the printer characteristics 142. For example, raster image objects may be converted from an original resolution to a new resolution matching the printer's native resolution. In addition, the raster image objects may be rotated based on the printer's rotation and/or on an additional rotation as may be specified by the print job object layout. The pre-rasterized objects may also be converted to a particular file format based on analysis of characteristics of the printer's performance as may be contained in the printer characteristics 142. For example, timing information generated in response to the RIP 154's ability to decompress compressed files, such as compressed images, may be used to determine an optimal compression level to provide the pre-rasterized objects in the print job 144. For example, it may be more efficient to provide images in an uncompressed form or at a lower level of compression than might otherwise be used if the RIP 154 is slow at decompressing images. In addition, the RIP's ability to decompress files in particular formats (such as TIFF vs JPG) may be used to determine which file format to store the pre-rasterized objects in for delivery in the print job. Additional details of various embodiments of pre-rasterization processes and output files are described below with respect to FIG. 6.

The pre-rasterized objects may then be stored in a memory of the typesetter 110, such as in database 230 of FIG. 2. At stage 540 the pre-rasterized objects may then be combined with print layout information to generate the pre-rasterized print job 144. As noted previously, the pre-rasterized print job 144 will include one or more pre-rasterized objects as well as instructions to be executed on the RIP to generate the final printer output. In an exemplary embodiment, the pre-rasterized print job includes a PostScript file including these elements. In some embodiment, additional elements such as the image objects in their original resolution may also be provided.

At a final stage 550, the pre-rasterized print job 144 is provided to the print system 150. This may be done manually by transfer of the print job 144 to a digital storage medium such as a magnetic disk, CD, DVD, DB, etc., Flash drive or other digital storage medium. The files may alternately be transferred to the printer system 150 via the network 130, as shown in FIG. 1A, and/or may be manually delivered to and installed on the RIP 154 by a user.

Pre-Rasterization Processing Embodiment Details

Figure 6A:
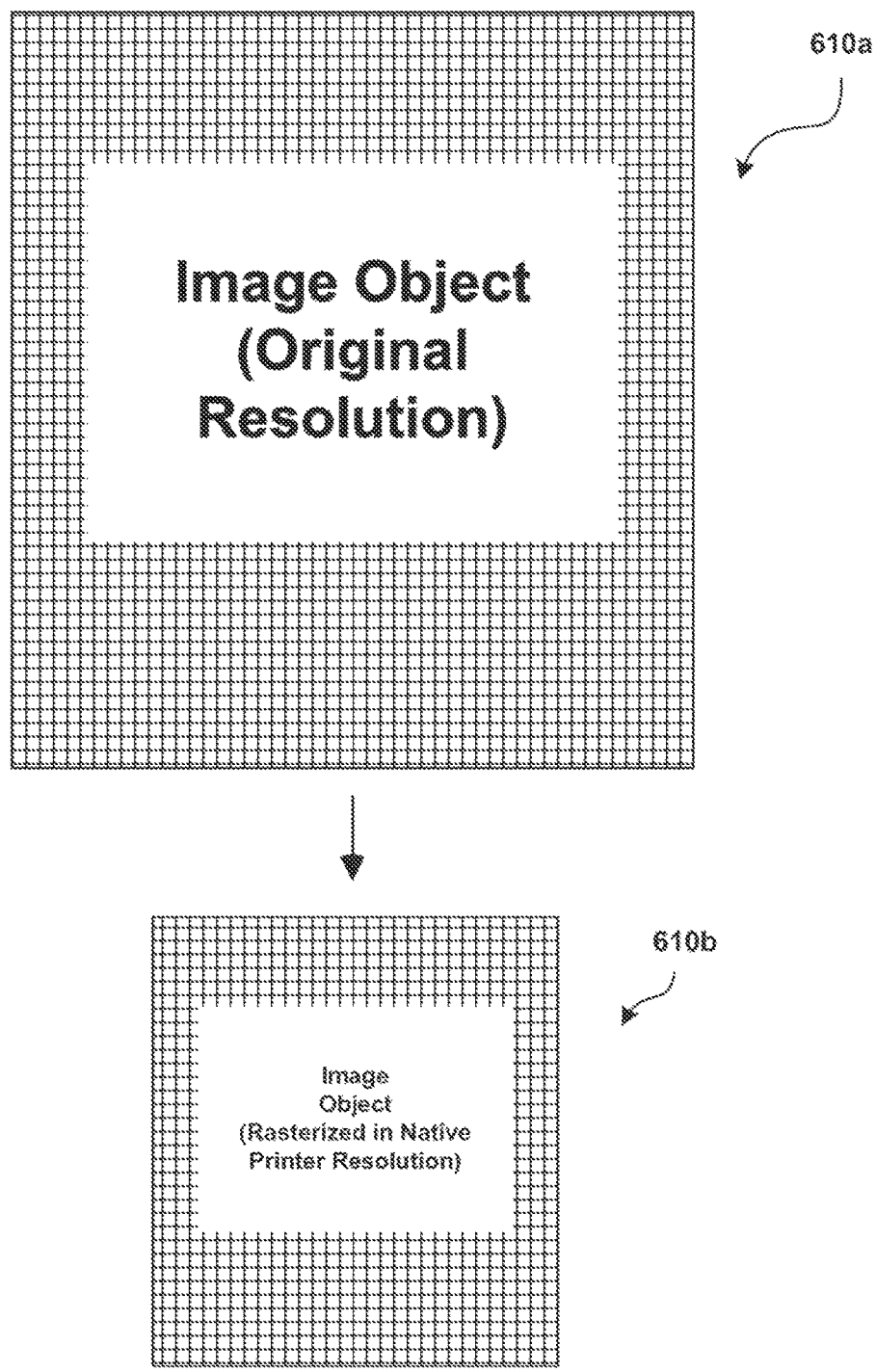
FIG. 6A is an illustration of details of resolution processing to facilitate pre-rasterization of print objects in accordance with aspects of the present invention.

Attention is now directed to FIG. 6A, which illustrates details of an object pre-rasterization as may be performed by various embodiments of the present invention. As shown in FIG. 6A, an image object 610a may be used by the composition system 120 in generation of a print layout. The object may represent any of a number of print objects provided in a raster format. A typical example would be an image object, which is a row/column representation of an image, graphic or other visual element. Image objects would typically be stored in a standard bitmap/raster format such as JPEG, TIFF, BMP, and the like. Consequently, the image object 610a defines the image elements as pixels in a row/column configuration. Common bitmap image resolutions include 640×480, 1024×768, etc. The image size may also be characterized by the total pixel size (i.e., 3.3 Megapixel (MP), 12 MP, etc.) which is the product of the number of row and column pixels.

Original images are typically in a relatively high resolution, and the final printed output generated by a printer such as printer 152 may need to be at pre-rasterized at a lower resolution to support the printer's native resolution. As noted previously, this often requires a resolution conversion from the image object 610a's original resolution to a new resolution 610b matching the size of the object as printed on the page in view of the printer's native resolution. There are a variety of techniques known in the art for doing such a resolution conversion (also known as re-sampling), and any of these techniques, as well as newly developed techniques, may be used to perform resolution conversion. However, a potential advantage of the present invention is to perform this resolution conversion based on the specific printer characteristics and final printed object size so as to eliminate or reduce the need for the RIP 154 to perform any image object rasterization to generate the output page layout dot pattern.

Pre-rasterization prepares an original image for printing according to the available image area and print characteristics for the printed document. For example, if the original image is at a 2000 by 2000 pixel size (i.e., the size of an output from a four megapixel image sensor), the desired output size on the printed page may require that the image is down-sampled to match the printer hardware's native resolution. If the printer's native resolution is 300 dots per inch (dpi) and the desired printed size of the image is 1 inch square, the image would be down-sampled to 300×300 pixels. This requires the pre-rasterization process to account for the printer's native resolution and the desired output size, and then pre-rasterize based on these parameters (and optionally compress the pre-rasterized image). In effect, the horizontal and vertical pixel sizes of the image are down-sampled by a factor k, where:

$$k = I/(X*S)$$

with
I=pixel size of the original image (number of pixels either vertically or horizontally assuming proportional scaling)
X=Native printer resolution in DPI
S=Dimensional size of output image (i.e., inches horizontally or vertically)

therefore, in this example, I=2000 pixels, X=300 DPI and S=1 inch, with k=6.6667. In some embodiments, it may be necessary to up-sample the original image, in which case k will be larger than 1. In addition, other steps in the pre-rasterization (in addition to image resizing) may be done at this stage including dithering, monochrome conversion, moire pattent cancellation, and other image processing steps such as are known in the art.

Figure 6B:
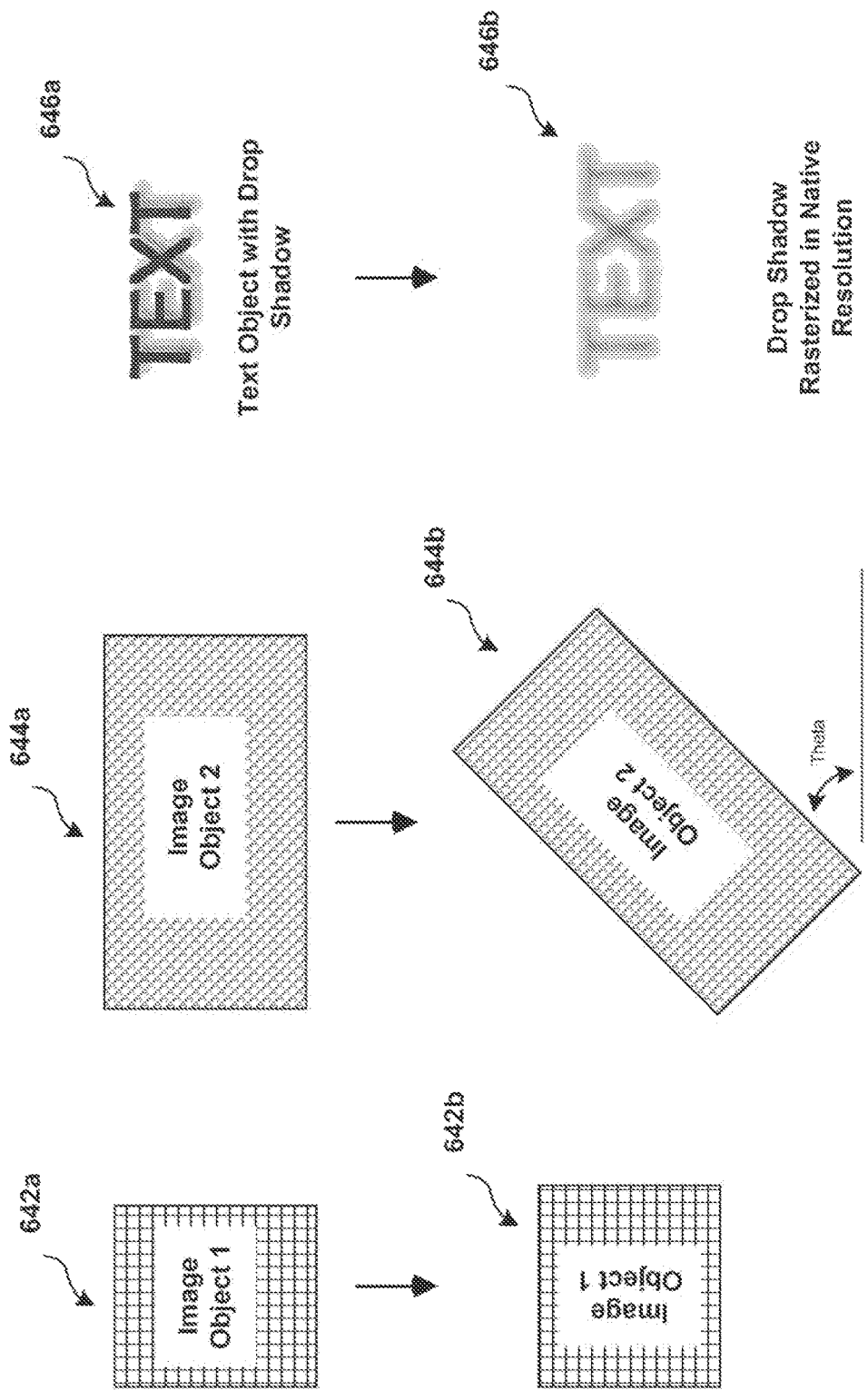
FIG. 6B is an illustration of details of resolution and rotation processing to facilitate pre-rasterization of print objects in accordance with aspects of the present invention.
Figure 6C:
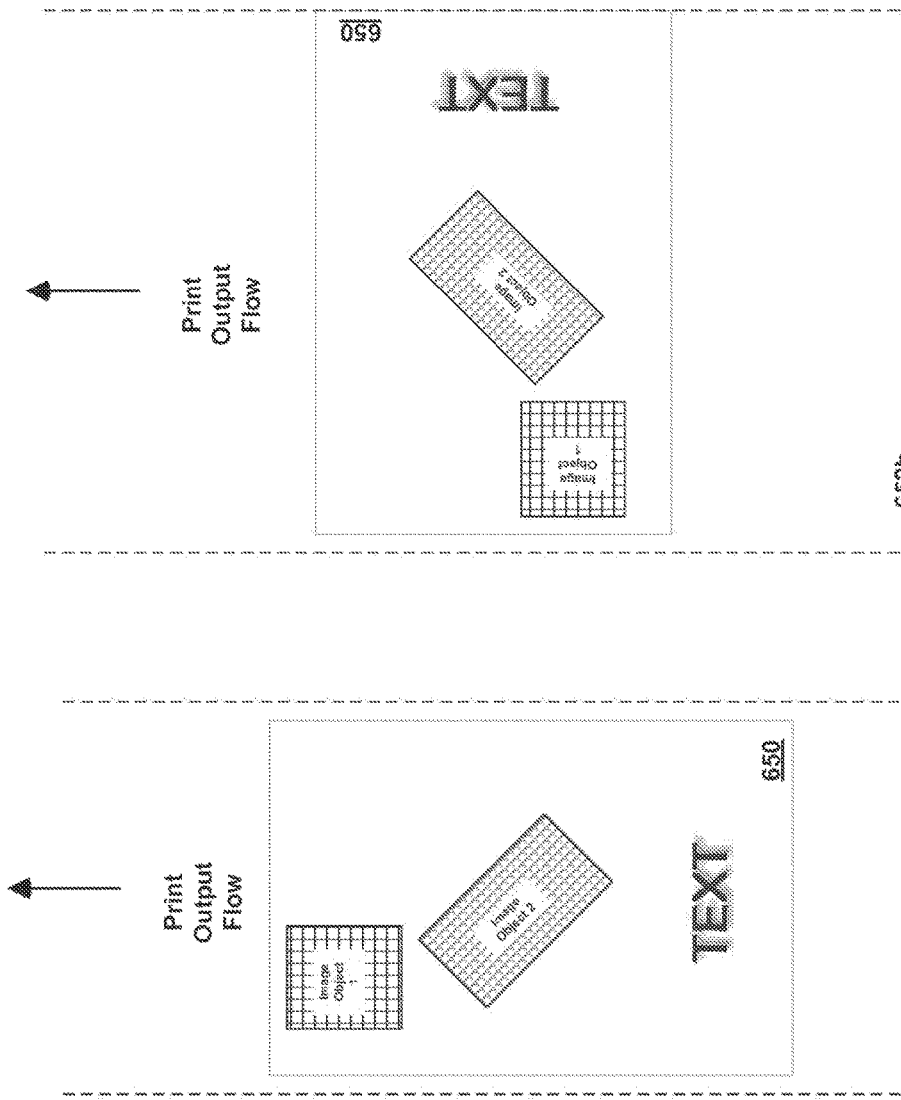
FIG. 6C is an illustration of details of printer output rotation processing to facilitate pre-rasterization of print objects in accordance with aspects of the present invention.

FIG. 6B illustrates examples of object rotation as may be performed by embodiments of the present invention. As shown in FIG. 6B, print job objects may include image objects 642a or 644a (image bitmaps), text objects with features such as a drop shadow 646A, or other objects such as text, vector objects, and the like (not shown). Image object 642a may be printed in accordance with the particular print job at it's original rotation (shown in 642a) and/or at another rotation such as −90 degrees (as shown in object 642b). Although +/−90 degree and 180 degree rotations have been known in the art, they have been used primarily in the context of predefined, fixed printer rotations. Image object 644b, however, illustrates pre-rasterization at an arbitrary rotation angle Theta (shown as approximately 45 degrees for purposes of illustration, but the rotation can be at any desired angle). Arbitrary rotation angles as are shown for object 644b may be used where an image object is rotated relative to the page as shown in FIG. 6C. In addition, for arbitrary page rotation angles, it may be desirable to also generate transparent elements in the output image file as described below with respect to FIG. 6E.

Figure 6D:
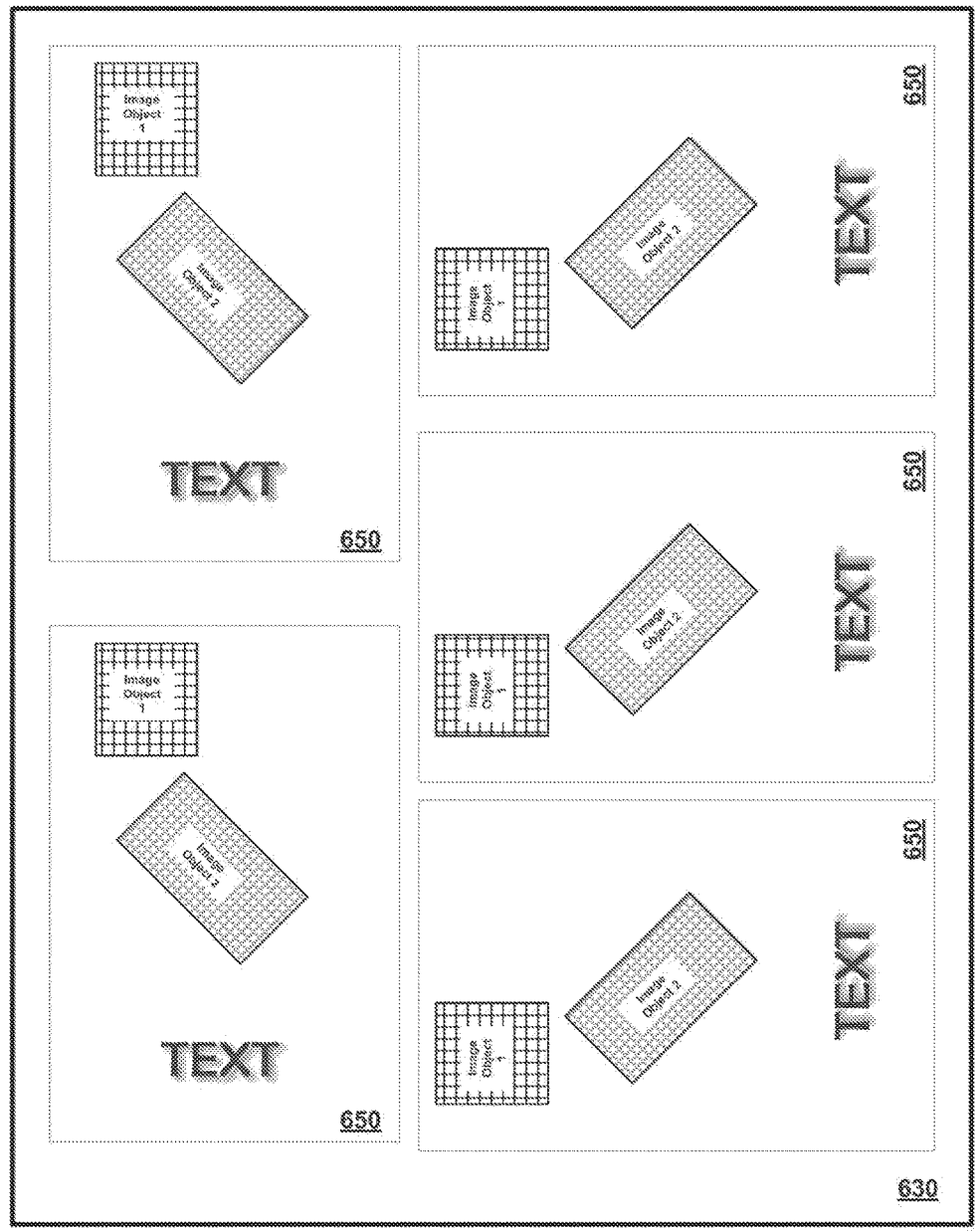
FIG. 6D is an illustration of details of multiple printer page rotation to facilitate pre-rasterization of print objects in accordance with aspects of the present invention.
Figure 6E:
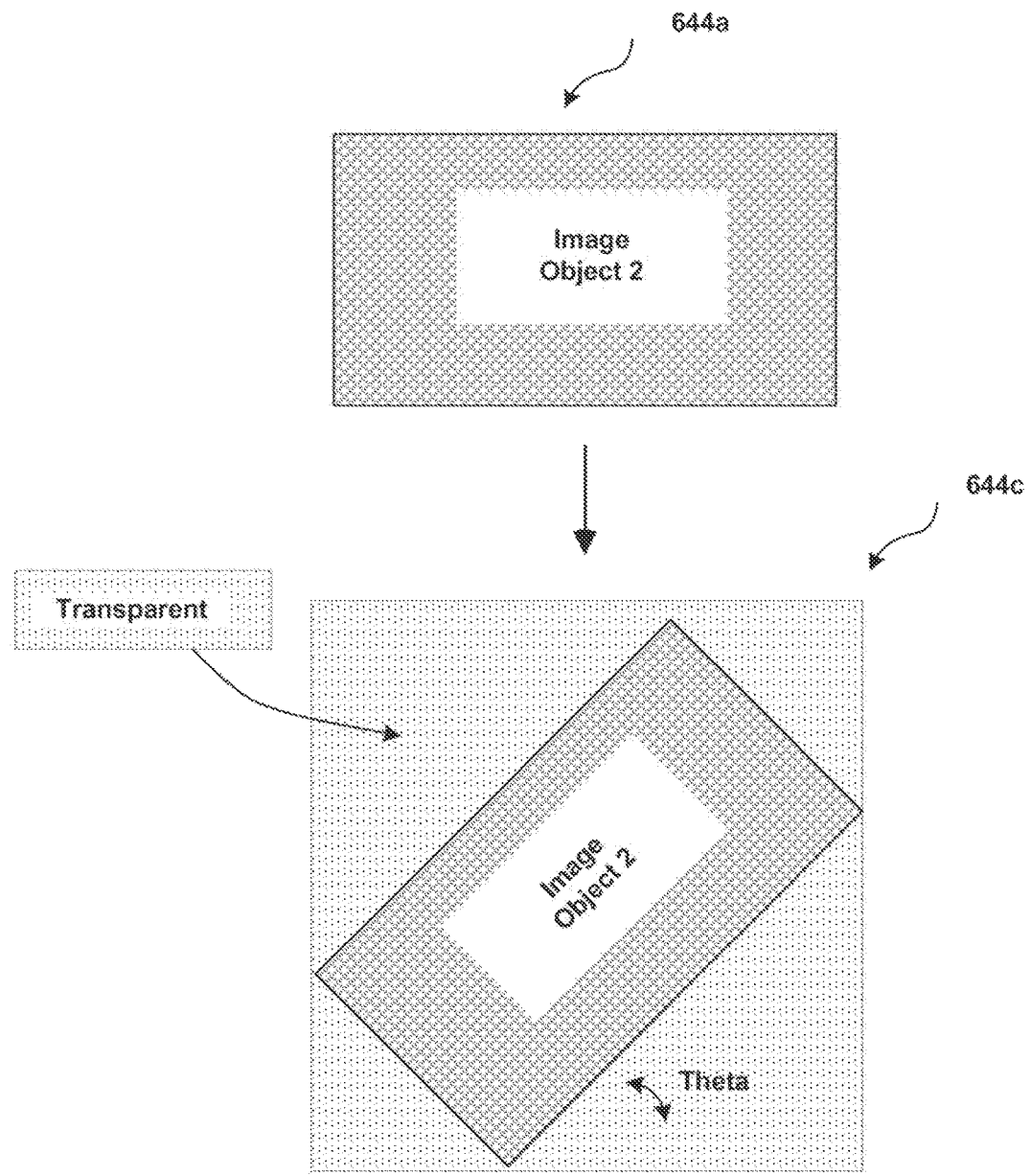
FIG. 6E is an illustration of details of transparency processing to facilitate pre-rasterization of print objects in accordance with aspects of the present invention.

FIG. 6E illustrates details of another aspect of the present invention. As shown in FIG. 6E, object 644a may be rotated to an arbitrary rotation Theta based on the characteristics of the printer and/or the requirements of the page layout. Although object 644 has been rotated, it will still be contained within an overall rectangular image frame in object 644c. Consequently, when rotated object 644c is provided to the printer, it is typically important that areas outside of the boundaries of the original object are defined as transparent (rather than black or white). This allows other print objects in the vicinity to show through the transparent areas if they are behind the rotated object 644c. Consequently, as part of the print rotation step, the rotated object may include an added transparent section defining areas outside of the boundaries of the original object 644a. The frame defined by the transparent area in FIG. 644c becomes the bounds of the pre-rasterized image with rotation. For example, with a monochrome object (or a color object converted to monochrome in the pre-rasterization process), a specific bit or bits of individual pixels may be used to define an area as transparent rather than as a shade of gray (or black or white).

Text object 646A illustrates text with a drop shadow feature 646B. In existing printing systems, drop shadow features such as feature 646B are generated only at the RIP 154, and can be time intensive to generate. Moreover, since these features are generated only at the RIP 154, it is not possible to accurately visualize how they will appear on the printed output before the printed output is generated. Consequently, pre-generation of drop shadow features such as drop shadow 646B may be advantageous to allow visualization of how the final printed drop shadow will look on the typesetter 110. This may be provided by, for example, displaying the drop shadow (or other pre-rasterized features) on a typesetter display such as display 250 of FIG. 2. A vector graphic image may also be rasterized at the matching resolution and print angle for the associated printer. This permits processing of files containing hybrid image types. For example, an encapsulated PostScript (EPS) file may be used instead of a JPEG (JPG) image where the EPS file contains vector image data as well as raster image components.

As noted previously, the typesetter 110 is configured to generate these pre-rasterization objects based on the desired print size for the object and the printer's native resolution and/or rotation. By knowing the printer's rotation angle, the same print layout may be generated for processing on different printers based on the specific printer characteristics. This is further illustrated in FIG. 6C which illustrates the printed output flow for two printers 652a and 652b. Printer 652a has a native vertical rotation (i.e., prints in "portrait" orientation as viewed in FIG. 6C), while printer 652b has a native horizontal rotation (i.e., prints in "landscape" orientation as viewed in FIG. 6C). Consequently, image objects 642a, 644a and 646A need to be pre-rasterized into different rotations (based on the native printer rotation) in order to be printed. If this is done in accordance with the present invention, the pre-rasterization process includes performing this rotation (as well as, if necessary, a resolution conversion) in the typesetter 110, rather than having it performed at the RIP 154 during execution of the print job. This permits the compositor 372 to confirm that a pre-rasterized image element is at the matching print angle and resolution for output on the assigned/targeted printer and to place the pre-rasterized image directly into frame buffer 378 without requiring any further processing by the RIP 370. This may provide significant advantages in speeding up the overall printing throughput.

FIG. 6D illustrates another example where pre-rasterization may be used to enhance printing performance. In this case, printed page 630 includes multiple copies of the print job (for printing page 650) on a single printed sheet. The individual sheets 650 may, for example, but out of sheet 650 after printing. In this example, the objects 642a, 644a and 646A can be provided to the RIP 154 in print job 144 in multiple pre-rasterized objects, with each object corresponding to a particular rotation (i.e., two rotations in this example for each object). In some cases, multiple rotations and/or resolutions of the same original object may be needed in the final print, and these can all be pre-rasterized to further speed up printing output.

Print Output Processing

Figure 7:
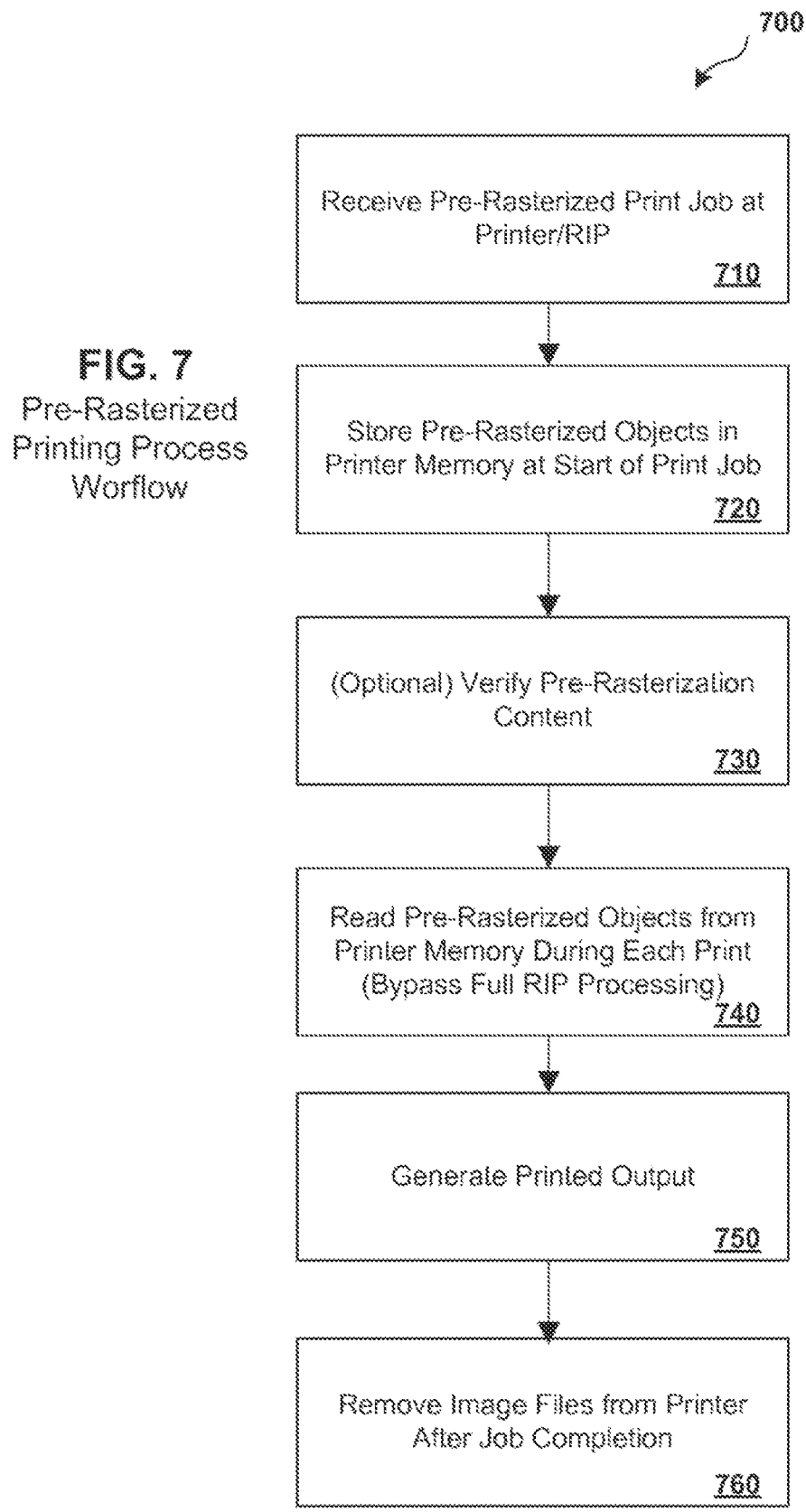
FIG. 7 is an illustration of one embodiment of a process for processing a pre-rasterized print job in accordance with aspects of the present invention.

Attention is now directed to FIG. 7 which illustrates details of generating printed output based on a pre-rasterized print job, such as print job 144 as shown in FIG. 1A. At stage 710 the pre-rasterized print job is received at a printer system 150 and printer 152. The pre-rasterized print job includes one or more pre-rasterized objects along with instructions for generating the printed page. In an exemplary embodiment, the print job is in the form of a PostScript file. After receipt, the pre-rasterized objects may be stored at stage 720 in a memory of a raster image processor, such as RIP 154 as shown in FIG. 1A. In addition, a verification step 730 may be performed to determine if the pre-rasterized objects match the printer's characteristics, including the native resolution and/or rotation. Additional details of an embodiment of this step are shown in FIG. 8.

At stage 740, the RIP 154 processes the print job based on the print job's instructions and the pre-rasterized objects to generate a page layout or page frame. This will typically be a bitmap, dot pattern, or other matrix defining the printed page. For example, for a monochrome printout, the dot pattern may consist of black dots (and blank spaces where no black dots are present) that defines the actual output pattern of the print rendering station, such as print rendering station 156 of FIG. 1A.

Finally, the printed output is generated at stage 750, typically by rendering the output on paper or other printable media using thermal toner, inks, etc. After printing is completed, the object files may be removed from the RIP 154 memory at stage 760 and/or any remaining data or information may be flushed prior to the start of the next print job.

Figure 8:
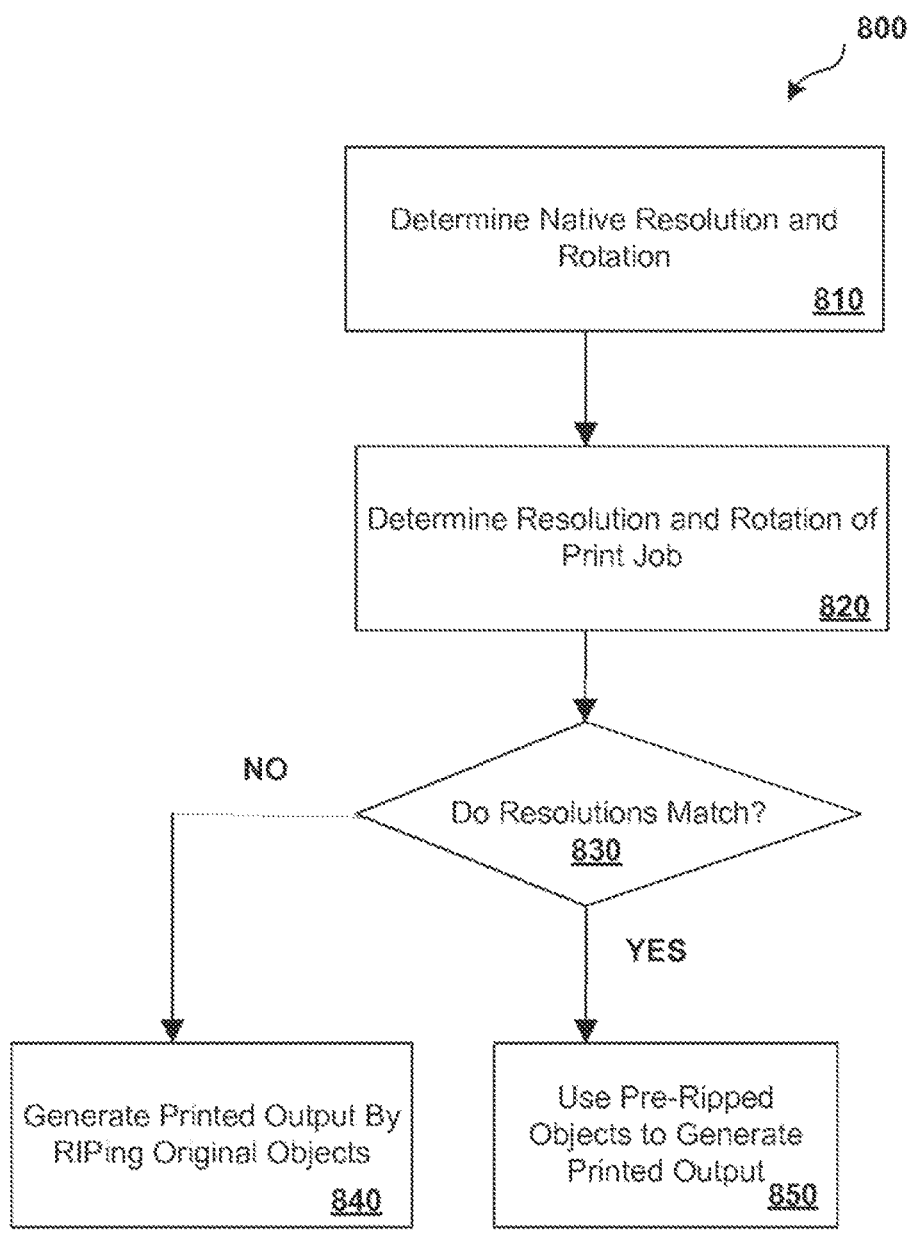
FIG. 8 is an illustration of one embodiment of a process for verifying the correct resolution of a pre-rasterized print job prior to generating printed output, in accordance with aspects of the present invention.

FIG. 8 illustrates additional details of an embodiment of a process 800 for print output processing. This process may be part of the overall print processing as shown in FIG. 7. At stage 810, printer characteristics including the native resolution and rotation angle of the printer may be determined or retrieved from memory. At stage 820, print job characteristics including the resolution and rotation angle may be determined. This may be done as part of the print job in the form of processing instructions included in the print job to perform the determination. The printer's characteristics are then compared in stage 830 with the corresponding parameters of the pre-rasterized objects in the print job to verify that they match. For example, the pre-rasterized characteristics may be included as data in the print job file. If the printer's native characteristics match those of the pre-rasterized print job, the print job may then be executed while minimizing use of RIP processing on the pre-rasterized objects (i.e., they need not be re-rasterized at the RIP) as shown in stage 850. If the parameters do not match and the original objects are included in the print job with the pre-rasterized objects, the RIP processing may include generation of native resolution objects by rasterizing the original objects in the RIP as is traditionally done as shown in stage 840. In this case, it is likely that print processing will be slowed to traditional speeds since the RIP will be unable to take full advantage of the pre-rasterized objects in the print job. The print job, however, will still be performed correctly, avoiding the often costly error of printing to the wrong device settings on the assigned/targeted printer.

PostScript Code Examples

An example embodiment of PostScript code for determining a printers native resolution and rotation angle can be found in the computer program listing appendix included on the compact disc. The resulting printed output is shown in FIG. 10.

As noted previously, when this code is executed on a PostScript compatible printer, the printed output is as shown in FIG. 10. In this case, the printer's native resolution is 600 dpi and the rotation angle is 0 (zero) degrees.

An example embodiment of PostScript code including an embedded pre-rasterized image can be found in the computer program listing appendix included on the compact disc. The resulting VDP output is shown in FIGS. 11A-11D.

Figure 11A:
FIG. 11A is an example first page of printed output from a PostScript file including an embedded pre-rasterized image file, in accordance with aspects of the present invention.
Figure 11B:
FIG. 11B is an example second page of printed output from a PostScript file including an embedded pre-rasterized image file, in accordance with aspects of the present invention.
Figure 11C:
FIG. 11C is an example fourth page of printed output from a PostScript file including an embedded pre-rasterized image file, in accordance with aspects of the present invention.
Figure 11D:
FIG. 11D is an example fourth page of printed output from a PostScript file including an embedded pre-rasterized image file, in accordance with aspects of the present invention.

FIGS. 11A, 11C, and 11D illustrates the first page of printed output including the pre-rasterized image of Jefferson located in the upper center of the output page. While a number of printed items are standardized between these two pages, there is also customer individualized information printed on each page, illustrating VDP functionality. FIG. 11B illustrates a second output page corresponding to FIG. 11A, where the pre-rasterized image of Jefferson is now placed at the bottom right of the page. In other printed outputs it may be placed at other locations, rotations, sizes, and/or may have other features described herein pre-rasterized, such as drop shadows.

It is noted that in various embodiments the present invention may relate to processes such as are described or illustrated herein. These processes are typically implemented in one or more modules as are described herein, and such modules may include computer software stored on a computer readable medium including instructions configured to be executed by one or more processors. It is further noted that, while the processes described and illustrated herein may include particular stages, it is apparent that other processes including fewer, more, or different stages than those described and shown are also within the spirit and scope of the present invention. Accordingly, the processes shown herein are provided for purposes of illustration, not limitation.

As noted, some embodiments of the present invention may include computer software and/or computer hardware/software combinations configured to implement one or more processes or functions associated with the present invention such as those described herein. These embodiments may be in the form of modules implementing functionality in software and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler or other machine code generation mechanisms, scripting programs, PostScripts programs, and/or other code or files containing higher-level code that are executed by a computer using an interpreter or other code execution mechanism.

Computer readable media may be in the form of one or more memory devices such as RAM, DRAM, SRAM or other memory devices. As used herein, the term memory includes individual banks of memory or memory devices as well as plural banks of memory or memory devices, where the plural memory may be incorporated in a single computer system or may be distributed among several computers or computer systems.

Computer code for storage on computer readable media may be comprised of one or more modules executing a particular process or processes to provide useful results, and the modules may communicate with one another via means known or developed in the art. For example, some embodiments of the invention may be implemented using assembly language, Java, C, C#, C++, scripting languages, PostScript, PPML, XML and/or other programming languages and software development tools as are known or developed in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for enhancing performance in a printing system, comprising:
    receiving, at the printing system, a pre-rasterized print job including one or more pre-rasterized objects and instructions for generating a printed page;
    storing, in a memory in communication with a raster image processor, the pre-rasterized print job;
    executing, using the raster image processor, the instructions to determine a native resolution and a rotation of a printer in the printing system;
    executing, using the raster image processor, the instructions to determine a native resolution and rotation of the pre-rasterized print job;
    comparing, with the raster image processor, corresponding parameters of the printer and the pre-rasterized print job wherein the corresponding parameters include the native resolution and the rotation of the printer and the native resolution and the rotation of the pre-rasterized print job;
    generating, based on the comparing, a comparison result; and
    rasterizing, when the comparison result is not a match, objects in the pre-rasterized print job to generate rasterized objects.

2. The method of claim 1, further comprising:
    reading, from the memory, the pre-rasterized print job, and
    generating, using the one or more pre-rasterized objects, a print file containing at least one of a page layout and a page frame.

3. The method of claim 2, further comprising rendering a printed output in the printing system.

4. The method of claim 3, wherein rendering includes rendering the printed output on paper or other printable media using thermal toner or ink.

5. The method of claim 3, further comprising removing, from the memory, the pre-rasterized print job.

6. The method of claim 1, wherein the objects within the pre-rasterized print job include unrasterized objects and the one or more pre-rasterized objects.

7. The method of claim 6, further comprising rendering a printed output in the printing system.

8. The method of claim 7, further comprising removing, from the memory, the pre-rasterized print job.

9. The method of claim 1, wherein the pre-rasterized print job is in the form of a Java, C, C#, C++, scripting languages, PostScript, PPML, or XML file.

10. A system for enhancing performance in a printing system, the system comprising:
    a typesetter configured to generate a pre-rasterized print job including one or more pre-rasterized objects and instructions for generating a printed page; and
    a printing subsystem including a raster image processor and a memory, configured to receive the pre-rasterized print job and the instructions, the printing subsystem being configured to store the pre-rasterized print job in the memory and to execute the instructions on the raster image processor to determine a native resolution and a rotation of a printer in the printing system and a native resolution and rotation of the pre-rasterized print job, the printing subsystem further being configured to:
    perform, using the raster image processor, a comparison by comparing corresponding parameters of the printer and the pre-rasterized print job wherein the corresponding parameters include the native resolution and the rotation of the printer and the native resolution and the rotation of the print job,
    generate a result of the comparison, and
    rasterize, when the comparison result is not a match, objects in the pre-rasterized print job to generate rasterized objects.

11. The system of claim 10, wherein the result of the comparison is a match and wherein the one or more pre-rasterized objects do not require re-rasterizing by the raster image processor.

12. The system of claim 11, wherein the raster image processor is configured to generate a print file containing a page layout or a page frame using the one or more pre-rasterized objects.

13. The system of claim 10, wherein the printing subsystem further comprises a rendering station, the rendering station configured to render a printed output.

14. A non-transitory processor-readable medium storing code that when executed cause a processor to:
    receive, at a printing system, a pre-rasterized print job including one or more pre-rasterized objects and instructions for generating a printed page;
    store, in a memory in communication with the processor, the pre-rasterized print job;
    execute the instructions to determine a native resolution and a rotation of a printer in the printing system;
    execute the instructions to determine a native resolution and rotation of the pre-rasterized print job;
    perform a comparison by comparing corresponding parameters of the printer and the pre-rasterized print job wherein the corresponding parameters include the native resolution and the rotation of the printer and the native resolution and the rotation of the pre-rasterized print job;
    generate a result of the comparison; and
    rasterize, when the comparison result is not a match, objects in the pre-rasterized print job to generate rasterized objects.

15. The non-transitory processor-readable medium of claim 14, wherein the result of the comparison is a match and the one or more pre-rasterized objects do not require re-rasterizing by the processor.

16. The non-transitory processor-readable medium of claim 14, wherein the code further causes the processor to generate a print file containing a page layout or a page frame using the one or more pre-rasterized objects.

* * * * *